United States Patent
Choi et al.

(10) Patent No.: US 9,073,405 B2
(45) Date of Patent: Jul. 7, 2015

(54) APPARATUS AND METHOD FOR A TELEMATICS SERVICE

(75) Inventors: Yoon Jeong Choi, Seoul (KR); Dae Lim Son, Seoul (KR); Eun Bok Lee, Seoul (KR); Jun Yong Jung, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 0 days.

(21) Appl. No.: 14/131,795

(22) PCT Filed: Apr. 24, 2012

(86) PCT No.: PCT/KR2012/003140
§ 371 (c)(1),
(2), (4) Date: Jan. 9, 2014

(87) PCT Pub. No.: WO2013/008996
PCT Pub. Date: Jan. 17, 2013

(65) Prior Publication Data
US 2014/0114532 A1    Apr. 24, 2014

(30) Foreign Application Priority Data

| | | |
|---|---|---|
| Jul. 14, 2011 | (KR) | 10-2011-0070054 |
| Jul. 21, 2011 | (KR) | 10-2011-0072443 |
| Jul. 28, 2011 | (KR) | 10-2011-0075068 |
| Aug. 2, 2011 | (KR) | 10-2011-0076904 |
| Aug. 8, 2011 | (KR) | 10-2011-0078711 |

(51) Int. Cl.
*B60H 1/00* (2006.01)
*F02N 11/08* (2006.01)
*G08G 1/16* (2006.01)

(52) U.S. Cl.
CPC ........ *B60H 1/00642* (2013.01); *F02N 11/0807* (2013.01); *F02N 2200/0804* (2013.01); *B60L 2260/56* (2013.01); *G08G 1/167* (2013.01)

(58) Field of Classification Search
CPC ............... B60L 2260/56; B60W 10/30; F02N 11/0807; F02N 11/0811; F02N 2200/122; B60H 2001/2234; B60H 2001/224; B60H 1/00642; B60H 1/00735
USPC ............... 701/2, 33.4, 36, 113; 700/276, 278, 700/299, 300
See application file for complete search history.

(56) References Cited

U.S. PATENT DOCUMENTS

| | | | |
|---|---|---|---|
| 2009/0133417 | A1* | 5/2009 | Egawa ............................. 62/132 |
| 2010/0217485 | A1* | 8/2010 | Ichishi ............................ 701/36 |

FOREIGN PATENT DOCUMENTS

| | | | |
|---|---|---|---|
| JP | 2002-264635 A | | 9/2002 |
| KR | 20-0214911 | * | 2/2001 |

(Continued)

OTHER PUBLICATIONS

International Search Report mailed Nov. 22, 2012 for PCT/KR2012/003140.

(Continued)

*Primary Examiner* — Spencer Patton
(74) *Attorney, Agent, or Firm* — Lowe Hauptman & Ham LLP

(57) ABSTRACT

A telematics service system and a terminal predict a driving start time of a vehicle based on a driving pattern of a user, compare status information of the vehicle and a set temperature before the predicted driving start time of the vehicle, and generate a temperature control signal so that an interior temperature of the vehicle reaches the set temperature. The terminal is fixed inside the vehicle. A vehicle electronic control device attached to the vehicle collects the status information of the vehicle, provides the collected information to the terminal device, and controls a temperature adjustment device of the vehicle in accordance with the temperature control signal of the terminal device to adjust the interior temperature of the vehicle to reach the set temperature.

13 Claims, 14 Drawing Sheets

(56) References Cited

FOREIGN PATENT DOCUMENTS

| KR | 20-0214911 Y1 | 2/2001 |
| KR | 10-2004-0039993 A | 5/2004 |
| KR | 10-2010-0122332 A | 11/2010 |

OTHER PUBLICATIONS

Written opinion of the International Searching Authority made on Nov. 23,2014 for PCT/KR2012/003140.

* cited by examiner

FIG. 10

| Time \ Day of week | Mon | Tue | Wed | Thu | Fri | Sat | Sun |
|---|---|---|---|---|---|---|---|
| ⋮ | | | | | | | |
| 7 a.m. | Driving | | | | | | |
| 8 a.m. | | | Driving | | | | |
| 9 a.m. | | | | | | | |
| 10 a.m. | | | | | | | Driving |
| 11 a.m. | | | | | | | |
| ⋮ | | | | | | | |
| 6 p.m. | Driving | | | | | | |
| 7 p.m. | | | | | Driving | | |
| 8 p.m. | | | | | | | |
| ⋮ | | | | | | | |

FIG. 11

| Time | Contents | Repetition |
|---|---|---|
| 8 a.m. ~ 9 a.m. | Attendance | Mon ~ Fri |
| 8 a.m. ~ 6 p.m. | Business operation | Mon ~ Fri |
| 6 p.m. ~ 7 p.m. | Leaving | Mon ~ Fri |
| ⋮ | | |

APPARATUS AND METHOD FOR A TELEMATICS SERVICE

CROSS REFERENCE TO RELATED APPLICATION

This application claims the priority of Korean Patent Application No. 10-2011-0070054, filed on Jul. 14, 2011 in the Korean Patent and Trademark Office, Korean Patent Application No. 10-2011-0072443, filed on Jul. 21, 2011 in the Korean Patent and Trademark Office, Korean Patent Application No. 10-2011-0075068, filed on Jul. 28, 2011 in the Korean Patent and Trademark Office, Korean Patent Application No. 10-2011-0076904, filed on Aug. 2, 2011 in the Korean Patent and Trademark Office and Korean Patent Application No. 10-2011-0078711, filed on Aug. 8, 2011 in the Korean Patent and Trademark Office. Further, this application is the National Phase application of International Application No. PCT/KR2012/003140 filed on Apr. 24, 2012, which is incorporated herein by reference in its entirety.

TECHNICAL FIELD

The present invention relates to an apparatus and method for telematics services in which vehicles and wireless communication technologies are combined, and more specifically, to an apparatus and method for providing various telematics services linked with a vehicle using a terminal device which a user possesses.

BACKGROUND ART

A vehicle first appeared in the late 17th century has become a representative means of transportation while being consistently developed and supplemented, and in recent years, one or more vehicles per household has been realized with the advent of various kinds of vehicles such as a large luxury car, an economical small car, and the like.

In addition, by combining vehicles and wireless communication, telematics services which enable various services such as location information provision, traffic information provision, safe driving, entertainment, financial and product purchase, and the like to be provided to users in the vehicles are provided.

An existing telematics device combines a global positioning system (GPS) using an artificial satellite and a geographic information system so as to provide basic services such as traffic information provision based on location information, remote vehicle diagnosis services, and the like, but is implemented as a separate device such as a type mounted in a vehicle or a navigation device, and therefore a burden of expenses of users is large.

Meanwhile, with recent development of communication and digital technologies, performance of mobile terminal devices and quality of mobile communication services are improved, and the diffusion of high-performance mobile terminal devices is also improved. Thus, when telematics services can be provided by associating mobile terminal devices possessed by most of users with vehicles, it can be expected to obtain more excellent effects in terms of costs and user's convenience.

In addition, it can be expected that creation and provision of more various services are possible in terms of safe driving and user's convenience rather than simple services such as existing location-based traffic information provision or remote vehicle diagnostics.

DISCLOSURE

Technical Problem

The present invention is directed to providing an apparatus and method for telematics services, which may provide various telematics services to occupants of a vehicle by enabling a terminal device of a user having communication and information processing functions to be linked with the vehicle.

In particular, the present invention is directed to providing an apparatus and method for telematics services, which may enable, particularly, a driver to receive a message including texts as audio and create and transmit an audio-based message, thereby promoting safe driving while improving user convenience.

In addition, the present invention is directed to providing an apparatus and method for telematics services, which may alert a driver, passengers, or a driver of another vehicle by sensing lane departure caused by drowsy driving and inattention while driving, thereby inducing safe driving while driving at night.

In addition, the present invention is directed to providing an apparatus and method for telematics services, which may alleviate discomfort of a user by appropriately controlling an interior temperature of a vehicle in advance at the time of boarding the vehicle.

In particular, the present invention is directed to providing an apparatus and method for telematics services, which may automatically adjust an interior temperature of a vehicle to be a set temperature before driving of the vehicle by predicting a driving start time in accordance with a driving pattern of a user, thereby automatically adjusting the interior temperature of the vehicle without user's attention or intervention.

In addition, the present invention is directed to providing an apparatus and method for telematics services, which may collect a plurality of pieces of eco data in accordance with a driving state of a vehicle, and combine the collected eco data to calculate and provide an eco index, thereby promoting economical driving.

In addition, the present invention is directed to providing an apparatus and method for telematics services, which may be associated with social network services, thereby providing telematics services based on social relationship.

In particular, the present invention is directed to providing an apparatus and method for telematics services, which may calculate fuel efficiency of a vehicle, share fuel efficiency information including the calculated fuel efficiency value with acquaintances, and compare fuel efficiency for each group, thereby promoting economical driving.

Technical Solution

One aspect of the present invention provides a telematics service system including a third service device that performs at least one of sharing, posting, and transmission of a message including texts with respect to a large number of users; and a terminal device that converts, when receiving the message including the texts with respect to a specific user from the third service device while driving of a vehicle, the texts included in the received message into audio data to output the audio data to the user, recognizes the user's voice, converts the recognized user's voice into texts, and transmits a message including the converted texts to the third service device.

Another aspect of the present invention provides a telematics service system including a terminal device that detects a lane departure by distinguishing an intended lane change and a lane departure due to inattention, and notifies a driver, passengers, or a driver of another vehicle of dangerous driving when detecting the dangerous driving including the lane departure; and a vehicle electronic control device that collects vehicle information for detecting the lane departure by distinguishing the intended lane change and the lane departure due to inattention and environment information around the vehicle to thereby provide the collected information to the terminal device.

Still another aspect of the present invention provides a telematics service system including: a terminal device that predicts a driving start time of a vehicle based on a driving pattern of a user, compares status information of the vehicle and a set temperature before the predicted driving start time of the vehicle, and generates a temperature control signal so that a temperature of the vehicle reaches the set temperature; and a vehicle electronic control device that is attached to the vehicle, collects the status information of the vehicle to provide the collected information to the terminal device, and controls a temperature adjustment device of the vehicle in accordance with the temperature control signal of the terminal device to adjust an interior temperature of the vehicle.

Yet another aspect of the present invention provides a telematics service system including a vehicle electronic control device that collects a plurality of pieces of eco data indicating a status of a vehicle related to economical driving to provide the collected data to a terminal device; the terminal device that receives the plurality of pieces of eco data indicating the status of the vehicle from the vehicle electronic control device, combines the received eco data, calculates an eco index obtained by grading a degree of the economical driving with respect to driving of the vehicle, and compares the calculated eco index and a predetermined reference eco index to output a comparison result; and a vehicle service device that manages the comparison result of the eco index received from the terminal device.

Further aspect of the present invention provides a telematics service system including a vehicle electronic control device that provides flow rate change information of a vehicle and driving distance information thereof; a vehicle service device that receives fuel efficiency information of the vehicle from a plurality of terminal devices, and transmits group information including the fuel efficiency information to the terminal device corresponding to a predetermined acquaintance group; and the terminal device that receives the flow rate change information and the driving distance information to calculate the fuel efficiency of the vehicle, generates the fuel efficiency information including the calculated fuel efficiency value to provide the generated information to a server device, receives the group information from the server device, and outputs fuel efficiency comparison information for each group based on the group information.

In addition, a terminal device according to an embodiment of the present invention may include a communication unit that transmits and receives data to and from a third service device through a communication network; an input unit that receives a request of a user; a control unit that converts and outputs, when receiving a message which is shared, posted, and transmitted with respect to the user from the third service device while driving of the vehicle, texts included in the received message into audio data, and converts, when recognizing the user's voice, the recognized user's voice into texts to transmit the message including the converted texts to the third service device; and an audio processing unit that outputs the voice in which the texts are converted by the control unit as an audible sound, and recognizes the user's voice to provide the recognized user's voice to the control unit.

A terminal device according to another embodiment of the present invention may include: a control unit that includes a dangerous driving detection module which acquires vehicle information related to a vehicle driven by a user and environment information around the vehicle, analyzes the acquired vehicle information and environment information around the vehicle, and detects a lane departure of the vehicle by distinguishing an intended lane change and a lane departure due to inattention, and a dangerous driving warning module which notifies, when detecting the lane departure due to inattention, a driver, passengers, or a driver of another vehicle of dangerous driving; a storage unit that stores the vehicle information and the environment information around the vehicle; an input unit to input a request of a user; and an output unit that outputs a warning message in accordance with control of the control unit.

A terminal device according to still another embodiment of the present invention may include: a control unit that predicts a driving start time of a vehicle based on a driving pattern of a user, compares status information of the vehicle and a set temperature before the predicted driving start time of the vehicle, and generates a temperature control signal so that a temperature of the vehicle reaches the set temperature; a communication unit that receives the status information of the vehicle from a vehicle electronic control device for controlling the vehicle by communicating with the vehicle electronic control device, and transmits the temperature control signal to the vehicle electronic control device; an input unit that receives an automatic adjustment request for an interior temperature of the vehicle from the user; and a storage unit that stores the driving pattern.

A terminal device according to yet another embodiment of the present invention may include: a communication unit that receives a plurality of pieces of eco data indicating a status of a vehicle related to economical driving by communicating with a vehicle electronic control device; a storage unit that stores the plurality of pieces of eco data and a reference eco index obtained by grading a degree of economical driving with respect to driving of the vehicle received from a service device; a control unit that receives the plurality of pieces of eco data in accordance with a driving status of the vehicle from the vehicle electronic control device, calculates an eco index by combining the received eco data, and compares the calculated eco index and a predetermined reference eco index to output a comparison result; and an output unit that outputs the comparison result of the eco index with respect to the eco data extracted in accordance with the driving status of the vehicle.

A terminal device according to further embodiment of the present invention may include: a control unit that calculates fuel efficiency of a vehicle based on flow rate change information and driving distance information, generates fuel efficiency information including the calculated fuel efficiency value to transmit the generated information to a vehicle service device, receives group information including the fuel efficiency information for each predetermined acquaintance group from the vehicle service device, and controls to output fuel efficiency comparison information for each group based on the received group information; a communication unit that receives the flow rate change information and the driving distance information from the vehicle electronic control device, transmits the fuel efficiency information by communicating with the vehicle service device, and then receives the group information; and an output unit that outputs the fuel efficiency comparison information for each group.

In addition, a vehicle service device according to an embodiment of the present invention may include: a communication interface unit that transmits, to a terminal device, a reference eco index obtained by grading a degree of economical driving with respect to driving of a vehicle related to a plurality of pieces of eco data in accordance with a driving status of the vehicle, and receives a comparison result of an eco index from the terminal device; a storage unit that stores the reference eco index and the comparison result of the eco index for each driving of the vehicle; and a service control unit that manages the comparison result of the eco index received from the terminal device, and controls the stored result to be provided in accordance with a request of the terminal device.

A vehicle service device according to another embodiment of the present invention may include: a storage unit that stores acquaintance information for each predetermined acquaintance group among subscribers of services; a service control unit that generates group information including fuel efficiency information of a vehicle for each acquaintance group; and a communication interface unit that receives the fuel efficiency information of the vehicle from terminal devices to provide the received information to the service control unit, and transmits the group information generated by the service control unit to the terminal device corresponding to the acquaintance group among the terminal devices.

In addition, a telematics service method according to an embodiment of the present invention may include: operating, by a terminal device, in an audio-based service mode in accordance with a user's request while driving of a vehicle; monitoring generation of a user's voice or reception of a message including texts from a third service device while the terminal device is operated in the audio-based service mode; recognizing and converting the generated user's voice into texts when the user's voice is generated, and transmitting a message including the converted texts to the third service device; and converting texts included in a received message into audio data to output as an audible sound when receiving the message including the texts.

In addition, a telematics service method according to another embodiment of the present invention may include: acquiring, by a terminal device, vehicle information and environment information around the vehicle; monitoring whether a lane departure is performed when a movement speed of the vehicle is greater than or equal to a predetermined speed; analyzing image information with respect to at least one direction with respect to the vehicle among the environment information around the vehicle and the vehicle information to detect a lane departure or a lane change; analyzing images of a driver, whether another vehicle is present, whether a turn signal lamp is turned on, and a direction among the vehicle information and the environment information around the vehicle to determine whether the detected lane departure or lane change is caused by an intended lane change or a lane departure due to inattention; and controlling a vehicle electronic control device of the vehicle to notify a driver, passengers, or a driver of another vehicle of dangerous driving when the lane departure due to inattention is determined.

In addition, a telematics service method according to still another embodiment of the present invention may include: predicting, by a terminal device, a driving start time of a vehicle based on a driving pattern of a user; monitoring a present time and collecting status information of the vehicle before a predetermined time from the predicted driving start time; and comparing the collected status information of the vehicle and a set temperature and controlling an interior temperature of the vehicle in conjunction with a vehicle electronic control device so that the interior temperature of the vehicle reaches the set temperature.

In addition, a telematics service method according to yet another embodiment of the present invention may include: receiving, by a terminal device, a plurality of pieces of eco data indicating a status of a vehicle related to economical driving from a vehicle management device in accordance with a driving status of the vehicle from a vehicle electronic control device; calculating an eco index obtained by grading a degree of the economical driving with respect to driving of the vehicle by combining the received eco data; and comparing the calculated eco index and a predetermined reference eco index to thereby output a comparison result.

In addition, a telematics service method according to further another embodiment of the present invention may include: receiving, by a terminal device, flow rate change information and driving distance information from a vehicle electronic control device; calculating fuel efficiency of a vehicle based on the flow rate change information and driving distance information; generating fuel efficiency information including the calculated fuel efficiency value of the vehicle; transmitting the fuel efficiency information to a predetermined vehicle service device; receiving group information including fuel efficiency information of each acquaintance for each predetermined acquaintance group from the vehicle service device; and outputting fuel efficiency comparison information for each group based on the received group information.

In addition, a telematics service method according to further another embodiment of the present invention may include: storing, by a vehicle service device, acquaintance information for each set acquaintance group among subscribers of services; receiving fuel efficiency information of a vehicle from a plurality of terminal devices; generating group information including the fuel efficiency information of the vehicle for each acquaintance group; and transmitting the group information to the terminal device corresponding the acquaintance group among the terminal devices.

Advantageous Effects

An apparatus and method for telematics services according to an embodiment of the present invention may enable a terminal device which a user possesses to be linked with a vehicle electronic control device mounted in a vehicle to provide telematics services related to the vehicle, and therefore it is possible to achieve cost reduction for service implementation and create various services.

In particular, according to an embodiment of the present invention, when texts which are posted on or shared in SMS messages, MMS messages, e-mails, messengers, SNS, community services, or the like are received or created through a terminal device of a user, the received texts may be converted into audio data to be provided to the user, and the user's voice may be recognized to be created as texts, so that a driver may easily check or create messages without disturbing the driver, thereby promoting safe driving and user convenience.

In addition, according to an embodiment of the present invention, a lane departure may be sensed by distinguishing an intended lane change from a lane departure caused by inattention while driving, so that whether drowsy driving is performed may be detected to notify a driver, passengers, or a driver of another vehicle that dangerous driving is currently performed, thereby reducing the incidence of traffic accidents while driving, particularly, at night.

In addition, according to an embodiment of the present invention, a driving start time of a user may be predicted based on a driving pattern derived based on at least one of user's schedule information and driving history information, and an electronic control device of a vehicle may be controlled so as to adjust an interior temperature of the vehicle to be a set temperature before the predicted driving start time of the user, and therefore the interior temperature of the vehicle may be adjusted to be an appropriate temperature in advance when the user boards the vehicle for driving, whereby the user may drive the vehicle in a more comfortable environment.

In addition, according to an embodiment of the present invention, safe driving may be induced by providing a comparison result of eco indexes with respect to eco data collected in accordance with a driving state of a vehicle to users, economical driving information may be allowed to be recognized by drivers, a driving or starting habit of the user may be changed toward a more economical direction, and a plurality of pieces of eco data may be notified to the drivers through TTS functions while present driving information or start information are displayed, thereby providing information about an optimized driving condition to the drivers in real time.

In addition, according to an embodiment of the present invention, a terminal device may be linked with a vehicle electronic control device mounted in a vehicle, fuel efficiency of the vehicle may be calculated, fuel efficiency information including the calculated fuel efficiency value may be shared with predetermined acquaintance groups, and then the fuel efficiency may be compared.

As described above, according to an embodiment of the present invention, through a link between the terminal device and the vehicle electronic control device mounted in the vehicle, various telematics services may be provided, thereby satisfying various demands of users.

DESCRIPTION OF DRAWINGS

FIG. 10 is a diagram showing an example of a derived driving pattern according to a third embodiment of the present invention;

FIG. 11 is a diagram showing an example of schedule information that is used for deriving a driving pattern according to a third embodiment of the present invention;

MODES OF THE INVENTION

Figure 1:
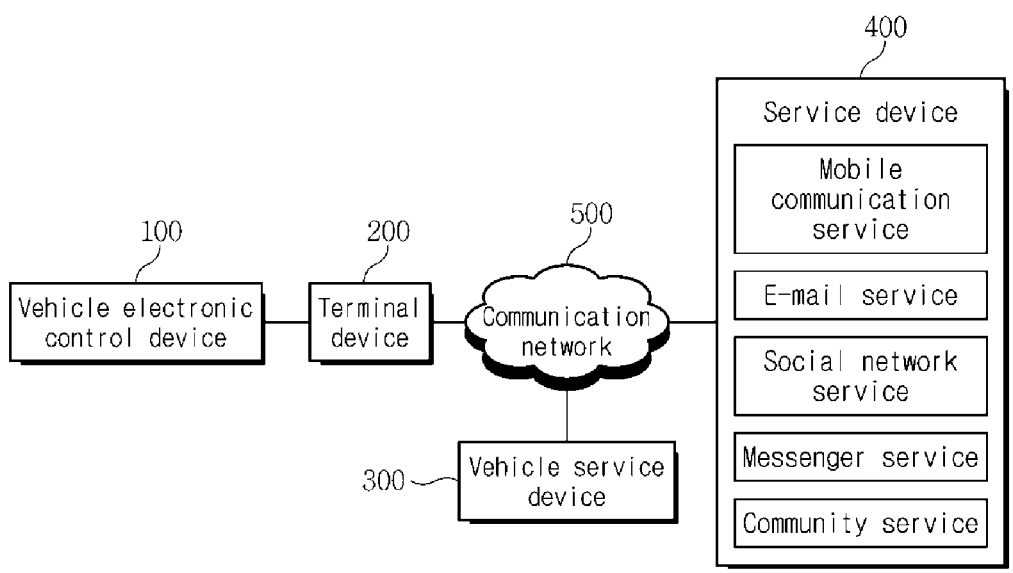
FIG. 1 is a block diagram showing an entire configuration of a telematics service system according to an embodiment of the present invention.

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention.

When it is determined that the detailed description of known art related to the present invention may obscure the gist of the present invention, the detailed description thereof will be omitted. The same reference numerals are used to refer to the same element throughout the specification. Terminology described below is defined considering functions in the present invention and may vary according to a user's or operator's intention or usual practice. Thus, the meanings of the terminology should be interpreted based on the overall context of the present specification.

FIG. 1 is a block diagram showing an entire configuration of a telematics service system according to an embodiment of the present invention.

Referring to FIG. 1, a telematics service system according to an embodiment of the present invention basically includes a vehicle electronic control device 100 and a terminal device 200, and according to another embodiment of the present invention, may further include a vehicle service device 300. In addition, according to still another embodiment of the present invention, the telematics service system may be linked with a third service device 400 which provides services through existing online.

The vehicle electronic control device 100 may be a means that controls various electronic devices mounted in a vehicle or detects and provides status information of the vehicle, and may be mounted in the vehicle or detachably mounted connected.

The terminal device 200 is a typical user device having communication and information processing functions used by a user, and for example, may be applied to various terminal devices such as a mobile communication terminal device such as a mobile phone or a smart phone, a multimedia terminal device, a wired terminal device, a fixed terminal device, an Internet protocol (IP) terminal device, and the like. However, the terminal device 200 may be effectively utilized when the terminal device 200 is a mobile terminal device having various mobile communication specifications such as a mobile phone, a portable multimedia player (PMP), a mobile Internet device (MID), a smart phone, a tablet PC, a notebook, a netbook, a navigation device, an information communication device, and the like.

The terminal device 200 according to the present invention is linked with the vehicle electronic control device 100 through wired/wireless communication technologies, thereby providing telematics services related to the vehicle to the user. In particular, the terminal device 200 collects and analyzes status information of a vehicle from the vehicle electronic control device 100, and transmits control commands for various electronic devices mounted in the vehicle to the vehicle electronic control device 100 in accordance with the analyzed result.

Transmission and reception of data between the vehicle electronic control device 100 and the terminal device 200 is performed in a wired or wireless manner, and communication is performed in one or more methods of, for example, local wireless communication (Bluetooth, Zigbee, radio frequency identification (RFID), infrared communication (IrDA, infrared data association), UWB (ultra wideband), and the like) and local wired communication (USB or the like).

The vehicle service device 300 is a server device for supporting telematics services provided through the vehicle electronic control device 100 and the terminal device 200, and is connected with the terminal device 200 through a communication network 500.

The third service device 400 is a device for providing arbitrary services through the communication network 500 including online, that is, an Internet network, and the services provided by the third service device 400 are not limited to the telematics services, and refer to services provided to various terminal devices connectable to the typical communication network 500.

The communication network 500 supports series of data transmission and reception for data transmission and information exchange among the terminal device 200, the vehicle service device 300, and the third service device 400, and may include any one of a wired communication network based on IP which is typically used, a wireless communication network, and a wired and wireless communication network. In particular, when the terminal device 200 includes a mobile communication function, the communication network 500 may include a mobile communication network including a code division multiple access (CDMA) network, a wideband CDMA (WCDMA) network, a high speed downlink packet access (HSDPA) network, a global system mobile communication (GSM) network, an evolved packet core (EPC) network, or the like.

The telematics service system according to the present invention may provide various telematics services related to a vehicle to a user, specifically, a user who boards the vehicle through a link among the vehicle electronic control device 100, the terminal device 200, the vehicle service device 300, and the third service device 400.

More specifically, according to a first embodiment of the present invention, the terminal device 200 of the above-described telematics service system may be connected to the third service device 400 that provides various services through the communication network 500, and therefore transmit and receive messages which are shared, posted, and transmitted through the third service device 400.

In this instance, the third service device 400 may provide services including sharing, posting, and transmission functions of a message including texts to a plurality of unspecified users through the communication network 500.

The services provided from the third service device 400 may include at least one of mobile communication services including a short message service (SMS) and/or multimedia message service (MMS), e-mail services, social network services (SNS) in which social networking among users are established and registered writings are shared among the established social networking, messenger services in which conversations or message transmission are possible among users, and community services such as a blog, mini homepage, or Internet café.

The message transmitted and received between the third service device 400 and the terminal device 200 may include at least one of an SMS message of a mobile communication service, an MMS message, an e-mail in which the user is a recipient or a sender, a writing registered by another user related to the user in the SNS, a reply of another user to the writing registered by the user in the SNS, a note of a messenger service, a character message transmitted and received through at least one of conversations, a post registered by another user on a predetermined web page of a community service, and a reply of another user to a writing registered by a user through the community service.

In this instance, the terminal device 200 according to the present invention is linked with the vehicle electronic control device 100. When receiving a message including a text about a specific user from the third service device 400 in a currently driving state, the terminal device 200 converts the text included in the received message into audio data to output the converted data to the user, recognizes the user's voice, converts the recognized user's voice into a text, and transmits the message including the converted text to the third service device 400. That is, the terminal device 200 outputs the text of the message transmitted through the third service device 400 into audio data, and creates a message transmitted to the third service device 400 as audio data, and therefore a user may use services provided from the third service device 400 without terminal operation using the user's fingers and disturbing the user's view.

In addition, according to a second embodiment of the present invention, the vehicle electronic control device 100 may monitor a driving status of a vehicle, and particularly, and collect vehicle information and environment information around the vehicle required for distinguishing and detecting an intentioned lane change and a lane departure due to inattention to provide the collected information to the terminal device 200.

The vehicle information may include at least one of whether a vehicle starts, a movement speed of a vehicle, whether a turn signal lamp of a vehicle is turned on, and a direction of a turned on lamp, and the environment information around the vehicle includes at least one of image information about at least one direction with respect to a vehicle, detection information of another vehicle positioned in at least one direction with respect to the vehicle, image information of a driver of the other vehicle, and detection information of pupil movement of the driver of the vehicle.

In this instance, the terminal device 200 analyzes the vehicle information and the environment information received from the vehicle electronic control device 100, detects a lane departure by distinguishing an intentioned lane change and a lane departure due to inattention which occur while driving of the vehicle, and notifies a driver of a corresponding vehicle, passengers, or a driver of another vehicle of dangerous driving when detecting the dangerous driving including the lane departure.

For this, the vehicle electronic control device 100 and the terminal device 200 may transmit and receive data in a wired or wireless manner, and perform communication in at least one method of local wireless communication (Bluetooth, Zigbee, RFID, infrared communication (IrDA, infrared data association), UWB (ultra wideband), and the like) and local wired communication (USB or the like). That is, in a communicable state with the vehicle electronic control device 100, more specifically, in a case in which the terminal device 200 is positioned inside a vehicle in which the vehicle electronic control device 100 is mounted, the terminal device 200 may acquire vehicle information and environment information around the vehicle from the vehicle electronic control device 100, and perform analysis of the acquired information and perform danger notification in accordance with the lane departure.

In addition, according to a third embodiment of the present invention, the terminal device 200 is connected to the vehicle electronic control device 100 in a wired or wireless communication method, and may be implemented so as to be fixed inside the vehicle within a communicable range with the vehicle electronic control device 100 or so as to be detachable from the vehicle, or implemented in the form of a portable device of a user. The terminal device 200 predicts a driving start time of a vehicle based on a driving pattern of a user, compares status information of the vehicle and a set temperature of the vehicle before the predicted driving start time, and generates a temperature control signal so that an interior temperature of the vehicle reaches a predetermined temperature. For this, the vehicle electronic control device 100 collects the status information of the vehicle to provide the collected information to the terminal device 200, and controls a temperature adjustment device (not shown) of the vehicle such as an air conditioner or a heater in accordance with the temperature control signal of the terminal device 200 to thereby adjust the interior temperature of the vehicle. In addition, prior to adjustment of the interior temperature of the vehicle, the terminal device 200 may determine whether the vehicle starts through the vehicle electronic control device 100, and directly instruct the start of a starting device (not shown) of the vehicle through the vehicle electronic control device 100.

In addition, according to a fourth embodiment of the present invention, the terminal device 200 executes an eco mode through an eco application in accordance with a user's input. Here, the terminal device 200 may receive a reference eco index for comparing eco indexes with respect to eco data from the vehicle service device 300 in accordance with the execution of the eco application and update the received reference eco index. In addition, the terminal device 200 receives a plurality of pieces of eco data from the vehicle electronic control device 100. In this instance, the terminal device 200 may receive eco data which is separated in accordance with a driving status such as before driving of the vehicle, while driving of the vehicle, stoppage while driving, or completion of driving of the vehicle. Here, eco data is information indicating a status of the vehicle related to economical driving.

For example, the terminal device 200 receive, from the vehicle electronic control device 100, the eco data for economical driving such as whether preheating of an engine is performed, whether sudden start is performed, whether sudden braking is performed, whether inertia driving is performed, an air pressure of a tire, whether cruise control is performed, whether an economical speed is maintained, an idling time, a load weight, whether an air conditioner is used, whether a heater is used, and a vehicle supplies status.

The terminal device 200 calculates an eco index by combining the eco data received from the vehicle electronic control device 100. In this instance, the terminal device 200 applies a numerical value distinguished depending on the importance of vehicle driving to the eco data received from the vehicle electronic control device 100, and combines the eco data in accordance with the applied numerical value to determine the eco index. That is, the terminal device 200 distinguishes the importance of the eco data as numerical values according to the driving status of the vehicle, and according to the distinguished numerical values, the terminal device 200 may determine the eco index. Here, the eco index is data obtained by grading a degree of economical driving with respect to driving of the vehicle.

The terminal device 200 compares an eco index calculated by analyzing the eco data received through the vehicle electronic control device 100 and a predetermined reference eco index to provide a comparison result to a user. In this instance, when the driving status of the vehicle is before driving of the vehicle, the terminal device 200 outputs a comparison result of an eco index with respect to a previous boarding history of the vehicle and eco data corresponding to an engine preheating time or vehicle supplies status as a TTS function, or outputs the comparison result of the eco index and the eco data as characters on a screen. In addition, when the status information of the vehicle is while driving of the vehicle, the terminal device 200 extracts the eco data corresponding to whether sudden start is performed, whether sudden braking is performed, whether inertia driving is performed, whether cruise control is performed, whether an economical speed is maintained, whether an air conditioner is used, whether a heater is used, or the like, which are related to driving of the vehicle, and outputs the comparison result with respect to the eco index of the extracted eco data as the TTS function or outputs the comparison result as characters on the screen. In this instance, since the terminal device 200 is in a state in which the vehicle is moving, the terminal device 200 may provide only minimum eco data required for driving. In addition, when the driving status of the vehicle is stoppage while driving, the terminal device 200 extracts eco data corresponding to whether inertia driving is performed, whether cruise control is performed, whether an economical speed is maintained, whether an air conditioner is used, and whether a heater is used, which are applied or collected between driving of the vehicle, and outputs a comparison result of an eco index with respect to the extracted eco data as a TTS function or outputs the comparison result as characters on the screen. In addition, when the driving status of the vehicle is completion of the driving because the vehicle arrives at a destination, the terminal device 200 outputs a comparison result of an eco index with respect to eco data corresponding to whether sudden start is performed, whether sudden braking is performed, whether inertia driving is performed, whether cruise control is performed, whether an economical speed is maintained, whether an air conditioner is used, whether a heater is used, an air pressure of a tire, an idling time, a load weight, and a vehicle supplies status, which are related to a driving path of the vehicle, as the TTS function or outputs the comparison result of the eco index as characters on the screen.

The terminal device 200 may transmit the comparison result of the eco index in accordance with the driving status of the vehicle to the vehicle service device 300 and store the transmitted comparison result. Thus, the terminal device 200 may download and output the comparison result of the eco index managed through the vehicle service device 300, as necessary.

The vehicle electronic control device 100 is included in a part of a specific vehicle to control overall functions for driving of the vehicle. In particular, the vehicle electronic control device 100 may collect and provide the eco data in accordance of a request of the terminal device 200. Here, the vehicle electronic control device 100 frequently determines the status of the vehicle, and separately store data in which a specific error occurs among the determined data. In addition, the vehicle electronic control device 100 first provides the eco data which is recently collected over time to the terminal device 200.

The vehicle service device 300 stores and manages the comparison result of the eco index received from the terminal device 200 for each driving type of the vehicle, and provides the stored comparison result to the terminal device 200 in accordance with a request of the terminal device 200. Here, the vehicle service device 300 periodically provides the reference eco index with respect to the eco data to the terminal device 200.

Through this, the vehicle service device 300 provides the comparison result of the eco index with respect to the eco data collected in accordance with the driving status of the vehicle to the user to induce safe driving. In addition, the vehicle service device 300 enables economical driving information to be recognized by a driver, and enables a driving or starting habit to be changed toward a more economical direction. In addition, a plurality of pieces of eco data is notified to the driver through a TTS function, and present driving information or departure information are displayed together, thereby providing information about an optimized driving condition to the driver.

In addition, according to a fifth embodiment of the present invention, the terminal device 200 receives flow rate change information and driving distance information of the vehicle from the vehicle electronic control device 130 to calculate fuel efficiency of the vehicle, generates fuel efficiency information including the calculated fuel efficiency value to provide the generated fuel efficiency information to the vehicle service device 300, receives group information of acquaintances related to the user from the vehicle service device 300, and outputs and provides fuel efficiency comparison information for each group based on the group information so that a user may recognize the provided comparison result.

In this instance, the vehicle service device 300 receives fuel efficiency information from a plurality of terminal devices 200, and transmits group information including the fuel efficiency information to the terminal device 200 corresponding to a predetermined acquaintance group, so that the corresponding terminal device 200 may provide fuel efficiency service.

Hereinafter, a detailed configuration of each device for implementing the above-described various embodiments will be described with FIGS. 2 to 5.

Figure 2:
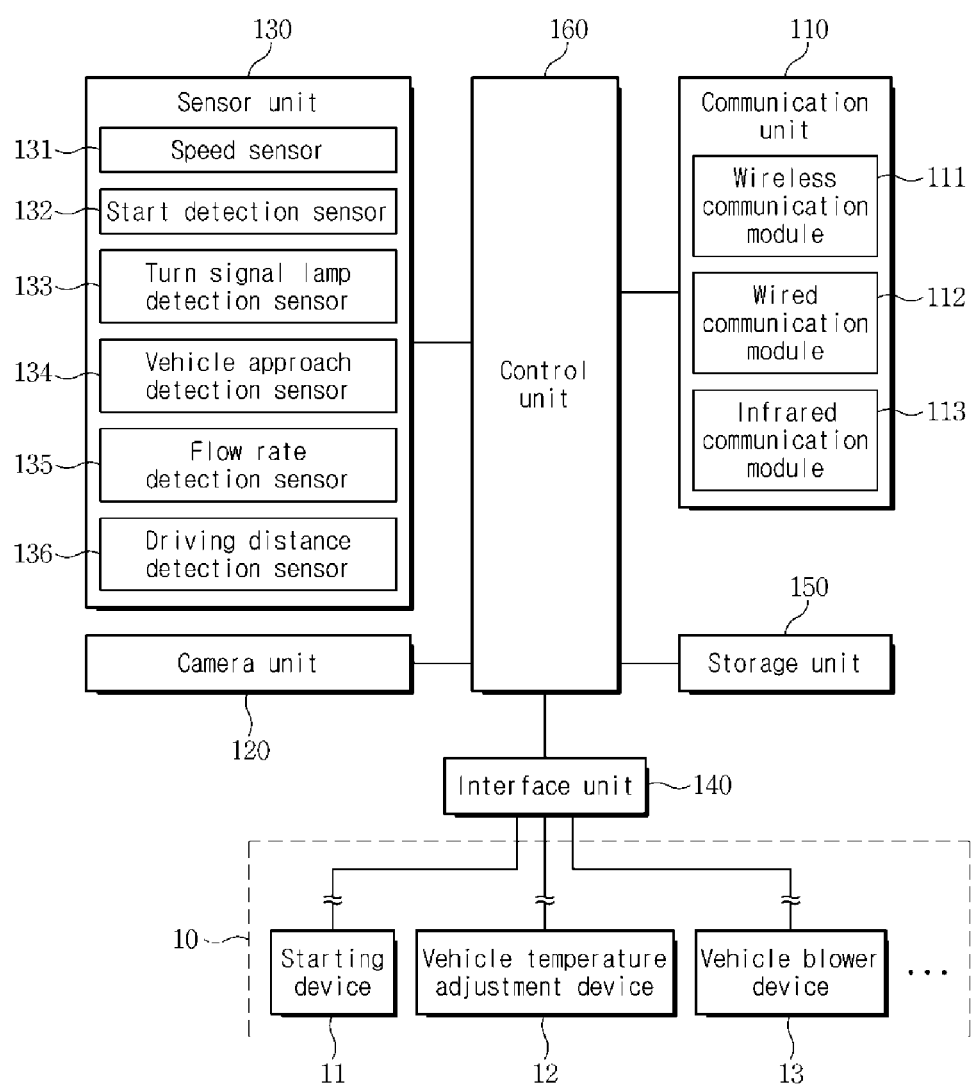
FIG. 2 is a block diagram showing a configuration of a vehicle electronic control device for telematics services according to an embodiment of the present invention.

FIG. 2 is a block diagram showing a configuration of a vehicle electronic control device for telematics services according to an embodiment of the present invention.

Referring to FIG. 2, the vehicle electronic control device 100 according to an embodiment of the present invention may include a communication unit 110, a camera unit 120, a sensor unit 130, an interface unit 140, a storage unit 150, and a control unit 160.

The communication unit 110 is connected with the terminal device 200 in a wired or wireless manner, and transmits and receives data to and from the terminal device 200. For this, the communication unit 110 may include at least one of various communication modules such as a wireless communication module, a wired communication module, or an infrared communication module.

The camera unit 120 may photograph front, rear, left, and right images of the vehicle as a means for generating image data as environment information around a vehicle. The image data photographed from the camera unit 120 may be transmitted to the terminal device 200 through the communication unit 110.

The sensor unit 130 is a means for detecting various vehicle information related to a vehicle status and a driving status and environment information around the vehicle, and specifically, detects the vehicle information such as whether a vehicle starts, a movement speed of the vehicle, whether a turn signal lamp is turned on, or a direction of a turned on lamp and the environment information around the vehicle such as whether another vehicle approaches the vehicle.

For this, the sensor unit 130 includes at least one of a speed sensor 131, a start detection sensor 132, a turn signal lamp detection sensor 133, a vehicle approach detection sensor 134, a flow rate detection sensor 135, and a driving distance detection sensor 136, and may detect whether the vehicle starts, a movement speed of the vehicle, whether a turn signal lamp is turned on, a direction of a turned on lamp, whether another vehicle approaches, a flow rate state of the vehicle, a driving distance, and the like.

The speed sensor 131 may detect a present driving speed of a vehicle by detecting a movement speed of the vehicle, the start detection sensor 132 may detect whether the vehicle starts, the turn signal lamp detection sensor 133 may detect whether a turn signal lamp is turned on and a direction of a turned on lamp, and the vehicle approach detection sensor 134 may detect a specific direction with respect to the vehicle, for example, presence of another vehicle when the other vehicle is present within a lateral certain distance.

The interface unit 140 performs interfacing so as to control the vehicle electronic control device 100 and various driving devices of a vehicle, for example, a starting device 11, a vehicle temperature adjustment device 12, a vehicle blower device 13, and the like. Here, the starting device 11 is a device that starts or turns off ignition of a driving means of a vehicle, and may be implemented so as to be operated by a smart key or a wireless control signal. Here, the driving means of the vehicle may be a motor operated by electrical energy supplied from a battery in an electrical vehicle, and may be an engine in a case of an internal combustion vehicle.

The vehicle temperature adjustment device 12 refers to a device that is operated for the purpose of temperature adjustment such as a heater and/or an air conditioner which is provided in a vehicle, and the vehicle blower device 13 refers to a device that causes wind in a vehicle. The vehicle blower device 13 may be operated together with the vehicle temperature adjustment device 12 for the purpose of temperature control.

The storage unit 140 stores data and program which are required for driving of the vehicle electronic control device 100 or which are generated while driving. The data and program stored in the storage unit 140 may be read through the control unit 160 to be used in monitoring and controlling a vehicle status.

The control unit 160 is a means for controlling overall control of the vehicle electronic control device 100, is operated based on an operating program installed in the vehicle electronic control device 100 to construct a basic platform environment of the vehicle electronic control device 100, and provides an arbitrary function by executing an application program in accordance with a user's selection. In particular, according to an embodiment of the present invention, the control unit 140 collects vehicle information and vehicle environment information which are required for distinguishing an intentioned lane change and a lane departure due to inattention and detecting the distinguished information, and transmits the collected information to the terminal device 200.

In addition, the control unit 160 controls various devices of the vehicle according to control of the terminal device 200.

For example, according to a first embodiment of the present invention, the control unit 160 may output audio data in which a message received from the terminal device 200 is converted through a speaker of the vehicle. In addition, according to a second embodiment of the present invention, devices of the vehicle are controlled through the interface unit 140 in accordance with a request from the terminal device 200, so that dangerous driving may be notified to a driver, passengers, or a driver of another vehicle. For example, the control unit 160 may notify a driver, passengers, or a driver of another vehicle of dangerous driving by turning on/off an emergency lamp of the vehicle, turning on a radio in a turned off state, or turning up the volume of the radio in the turned on state.

In addition, according to a second embodiment of the present invention, the control unit 160 analyzes the collected vehicle information and environment information around the vehicle instead of the terminal device 200, detects a lane change or a lane departure, and determines whether the detected lane change or lane departure is an intended lane change or the lane departure due to inattention.

In addition, according to a third embodiment of the present invention, the control unit 160 controls vehicle devices connected through the interface unit 140 in accordance with a control signal of the terminal device 200, for example, the starting device, 11, the vehicle temperature adjustment device 12, the vehicle blower device 13, and the like to thereby adjust an interior temperature of the vehicle to be a target temperature by starting the vehicle before boarding of the user.

In addition, according to a fourth embodiment of the present invention, the control unit 160 may collect eco data which is separated depending on a driving status of the vehicle such as before driving of the vehicle, while driving of the vehicle, stoppage while driving, or completion of driving of the vehicle, and provide the collected eco data to the terminal device 200. Here, the eco data may include at least one of whether preheating of an engine is performed, whether sudden start is performed, whether sudden braking is performed, whether inertia driving is performed, an air pressure of a tire, whether cruise control is performed, whether an economical speed is maintained, an idling time, a load weight, whether an air conditioner is used, whether a heater is used, and a vehicle supplies status.

In addition, according to a fifth embodiment of the present invention, the control unit 160 may transmit, to the terminal device 200, flow rate conversion information and a driving distance detection value which are collected through the flow rate detection sensor 135 and the driving distance detection sensor 136 which are included in the sensor unit 130.

Figure 3:
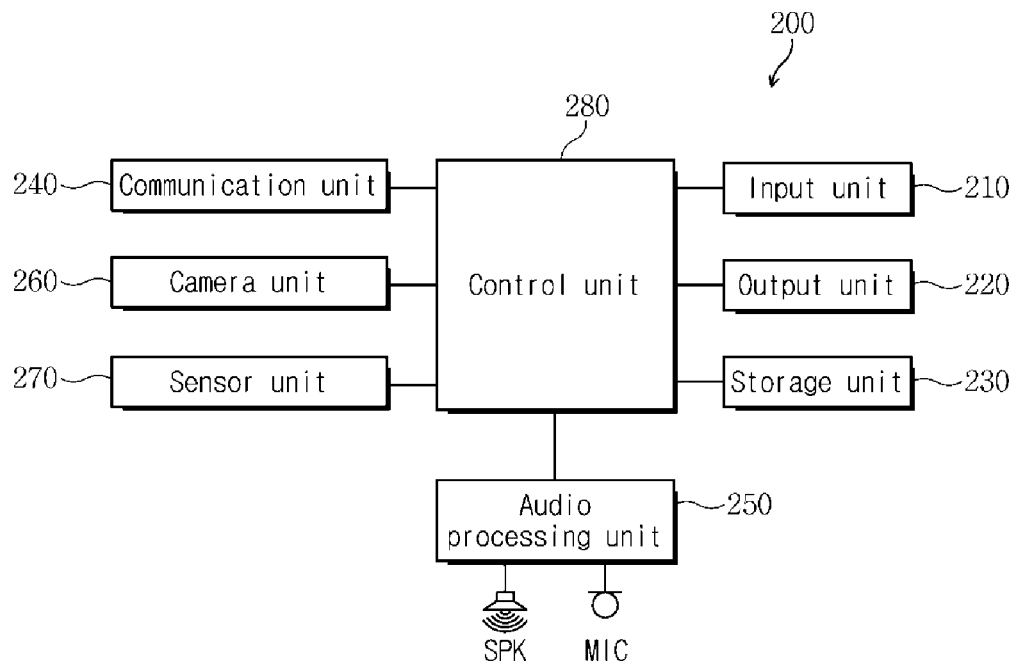
FIG. 3 is a block diagram showing an entire configuration of a terminal device for telematics services according to an embodiment of the present invention.

Next, FIG. 3 is a block diagram showing an entire configuration of a terminal device 200 for telematics services according to an embodiment of the present invention.

Referring to FIG. 3, the terminal device 200 according to the present invention may include an input unit 210, an output unit 220, a storage unit 230, a communication unit 240, an audio processing unit 250, a camera unit 260, a sensor unit 270, and a control unit 280.

The input unit 210 is a means for receiving a request of a user. The input unit 210 may be implemented as various input means, and may include a key operation means including at least one button such as a keyboard or a keypad, a pointer device capable of operating a position of a designated pointer such as a mouse or a track ball, and a gesture recognition means capable of detecting a gesture such as a behavior of a user or movement of a terminal to identity a user's request.

The output unit 220 outputs an operation state of the terminal device 200 and a user interface screen of a specific application so that a user may recognize the output information. In particular, in the first embodiment of the present invention, in accordance with the control of the control unit 280, a message including the received text and a text in which a user's voice is converted may be visually displayed. Such a function may be necessarily provided for convenience of a user, and may be omitted as necessary. In addition, in the second embodiment of the present invention, a dangerous driving warning message may be visually output. The output unit 220 may include various display means. For example, the output unit 220 may be implemented as any one of a liquid crystal display (LCD), a thin film transistor-liquid crystal display (TFT-LCD), a light emitting diode (LED), an organic light emitting diode (OLED), an active matrix organic light emitting diode (AMOLED), a flexible display, and a three-dimensional (3D) display.

Figure 4:
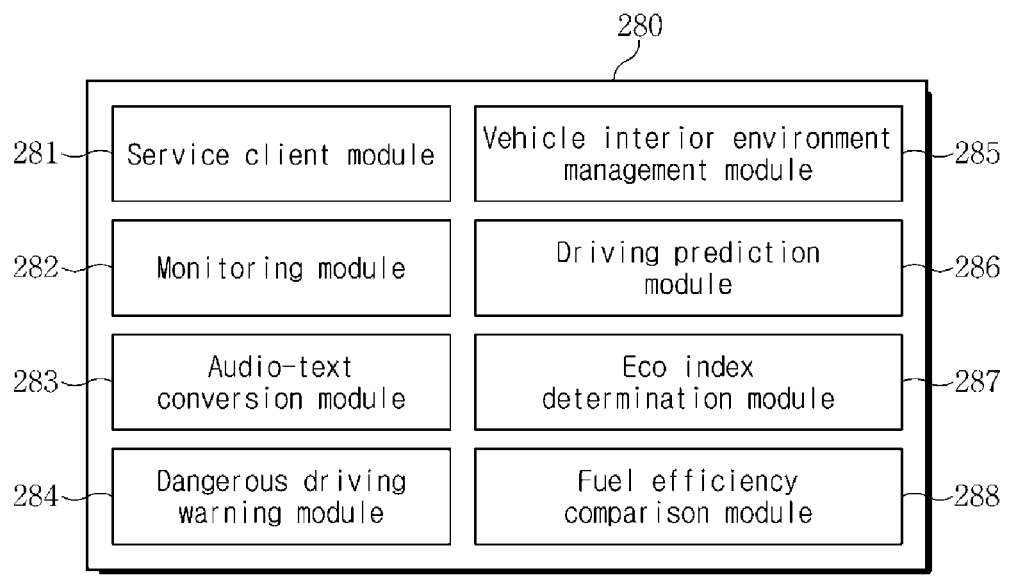
FIG. 4 is a function block diagram showing a detailed configuration of a control unit in a terminal device for telematics services according to an embodiment of the present invention.

The storage unit 230 stores programs and data required for operation of the terminal device 200, and stores, for examples, an OS program and an application program which are executed by the control unit 280. In particular, the storage unit 230 may store programs or codes corresponding to the various modules provided in the control unit 280 as shown in FIG. 4.

The communication unit 240 transmits and receives data by performing communication with at least one of the vehicle electronic control device 100, the vehicle service device 300, and the third service device 400. For this, the communication unit 240 may include at least one communication module that transmits and receives data through one of various communication methods such as a local wireless communication method, a mobile communication method, a wired communication method, an infrared communication method, and the like. More specifically, the communication unit 240 may perform communication with the vehicle service device 300 or the third service device 400 through the communication network 500, and transmit and receive data by performing communication with the vehicle electronic control device 100 through the wired communication method or the local wireless communication method.

In the first embodiment of the present invention, the communication unit 240 may receive a message including a text from the third service device 400, or transmit a message created by a user to the third service device 400. In the above, connection to the third service device 400 may be performed based on a predetermined IP address of the third service device 400 and user authentication information (ID, password, and the like).

The audio processing unit 250 is a means for processing audio signals such as a user's voice, music, or the like, outputs the audio signal as an audible sound through a speaker (SPK) or converts the audible sound detected through a microphone (MIC) into audio signals to transmit the audio signals to the control unit 280. When the terminal device 200 is a mobile communication terminal device, voice of an opposite party during conversation is output through the audio processing unit 250, and the user's voice is input. In particular, in the first embodiment of the present invention, the audio processing unit 250 outputs audio data in which a text is converted by the control unit 280 as an audible sound through the speaker (SPK), and recognizes the user's voice through the microphone (MIC) to provide the recognized user's voice to the control unit 280. Beyond this, various warning sounds may be output through the audio processing unit 250. In addition, in the fourth embodiment of the present invention, a comparison result of an eco index with respect to the eco data may be output as audio data.

The camera unit 260 is a means for photographing peripheral images, and may photograph peripheral environment images of a vehicle instead of the vehicle electronic control device 100, or photograph passengers of the vehicle, more specifically, a driver.

The sensor unit 270 is a means for detecting various pieces of information required for telematics services according to the present invention, and may detect vehicle status information or peripheral environment information instead of the vehicle electronic control device 100.

The control unit 280 is a device for controlling overall operations of the terminal device 200, and may be implemented as a combination of at least one of an OS program, an application program, and a microprocessor. More specifically, the control unit 280 is operated so as to provide various telematics services to a user in conjunction with at least one of the vehicle electronic control device 100, the vehicle service device 300, and the third service device 400.

Specifically, in the first embodiment of the present invention, the control unit 280 is connected to the third service device 400 through the communication unit 110 in accordance with a request of the user transmitted through the input unit 210, receives messages which are shared, posted, and transmitted with respect to the user from the third service device 400, converts a text included in the received message into audio data, recognizes a user's voice to convert the recognized user's voice into a text, and transmits a message including the converted text to the third service device 400.

In addition, in the second embodiment, the control unit 280 analyzes vehicle information related to a vehicle driven by a user and environment information around the vehicle, detects a lane departure of the vehicle by distinguishing an intended lane change and a lane departure due to inattention, and controls the terminal device 200 or the vehicle electronic control device 100 to notify a driver, passengers, or a driver of another vehicle of dangerous driving when detecting the lane departure due to inattention.

In addition, in the third embodiment, the control unit 280 predicts a driving start time based on a driving pattern of a user in accordance with an automatic adjustment request for an interior temperature of a vehicle, compares status information of the vehicle and a set temperature before the predicted driving start time of the vehicle, and generates a temperature control signal so that a temperature of the vehicle reaches the set temperature. Here, the status information of the vehicle may include at least one of whether the vehicle starts, the interior temperature of the vehicle, whether a door is opened or closed, whether a window is opened or closed, and whether the temperature adjustment device of the vehicle is operated, and the temperature control signal may be a control signal with respect to at least one of an air conditioner and a heater which are mounted in the vehicle. In addition, the control unit 280 may first determine whether the vehicle starts before controlling the interior temperature of the vehicle, and instruct to start the vehicle when the vehicle does not start.

In addition, in the fourth embodiment, the control unit 280 executes an eco mode through an eco application in accordance with an input of the user. Here, the control unit 280 may receive and update a reference eco index from the vehicle service device 300 in accordance with execution of the eco application.

The control unit 280 receives a plurality of pieces of eco data by being connected to the vehicle electronic control device 100. In this instance, the control unit 280 may receive the eco data which is distinguished depending on a driving status such as before driving of a vehicle, while driving of the vehicle, stoppage while driving of the vehicle, and completion of the driving of the vehicle. That is, the eco data is information indicating a status of the vehicle related to economical driving. For example, the control unit 280 may receive, from the vehicle electronic control device 100, the eco data for economical driving such as whether preheating of an engine is performed, whether sudden start is performed, whether sudden braking is performed, whether inertia driving is performed, an air pressure of a tire, whether cruise control is performed, whether an economical speed is maintained, an idling time, a load weight, whether an air conditioner is used, whether a heater is used, a vehicle supplies status, and the like.

The control unit 280 calculates an eco index by combining the eco data received from the vehicle electronic control device 100. In this instance, the control unit 280 applies a numerical value distinguished depending on the importance of vehicle driving to each of the received eco data, and combines the eco data in accordance with the applied numerical value to determine the eco index. That is, the control unit 280 may separate the importance of the eco data depending on the driving status of the vehicle as numerical values, and determine the eco index in accordance with the separated numerical values. Here, the eco index may be data obtained by grading a degree of economical driving with respect to driving of the vehicle.

The control unit 280 compares an eco index calculated by analyzing the eco data received through the vehicle electronic control device 100 and a predetermined reference eco index, and outputs a comparison result. In this instance, when the driving status of the vehicle is before driving, the control unit 280 outputs a comparison result of an eco index with respect to a previous boarding history of the vehicle and eco data corresponding to an engine preheating time, vehicle supplies status, and the like as a TTS function, or outputs the comparison result and the eco data as characters on a screen. In addition, when the driving status of the vehicle is while driving, the control unit 280 extracts eco data corresponding to whether sudden start is performed, whether sudden braking is performed, whether inertia driving is performed, whether cruise control is performed, whether an economical speed is maintained, whether an air conditioner is used, whether a heater is used, or the like, which are related to driving of the vehicle, and outputs a comparison result of an eco index of the extracted eco data as audio data through an audio-text conversion module 283 or outputs the comparison result as characters through the output unit 220. In this instance, since the driving status of vehicle is while driving, the control unit 280 may provide only minimum eco data required for driving. In addition, when the driving status of the vehicle is stoppage while driving, the control unit 280 extracts eco data corresponding to whether inertia driving is performed, whether cruise control is performed, whether an economical speed is maintained, whether an air conditioner is used, and whether a heater is used, which are applied or collected between driving of the vehicle, and outputs a comparison result of an eco index with respect to the extracted eco data as audio data through the audio-text conversion module 283 or outputs the comparison result as characters through the output unit 220. In addition, when the driving status of the vehicle is completion of the driving because the vehicle arrives at a destination, the control unit 280 outputs a comparison result of an eco index with respect to eco data corresponding to whether sudden start is performed, whether sudden braking is performed, whether inertia driving is performed, whether cruise control is performed, whether an economical speed is maintained, whether an air conditioner is used, whether a heater is used, an air pressure of a tire, an idling time, a load weight, and a vehicle supplies status, which are related to a driving path of the vehicle, as audio data through the audio-text conversion module 283 or outputs the comparison result of the eco index as characters through the output unit 220. The control unit 280 may transmit the comparison result of the eco index in accordance with the driving status of the vehicle to the vehicle service device 300 and store the transmitted comparison result. Thus, the control unit 280 may download and output the comparison result of the eco index managed through the vehicle service device 300, as necessary.

In addition, in the fifth embodiment of the present invention, the control unit 280 may receive flow rate change information and driving distance information to calculate fuel efficiency of the vehicle, generate fuel efficiency information including the calculated fuel efficiency value to provide the generated fuel efficiency information to the vehicle service device 300, receive group information from the vehicle service device 300, and output fuel efficiency comparison information for each group based on the group information so that the user may recognize the output fuel efficiency comparison information.

In addition, the control unit 280 may receive fuel efficiency comparison data for each group obtained by comparing the fuel efficiency information of the vehicle for each acquaintance group from the vehicle service device 300, and enable the fuel efficiency comparison data for each group to be included in the fuel efficiency comparison information for each group to output the fuel efficiency comparison information for each group. Alternatively, the control unit 280 may directly generate the fuel efficiency comparison data for each group, and enable the fuel efficiency comparison data for each group to be included in the fuel efficiency comparison information for each group to output the fuel efficiency comparison information for each group.

FIG. 4 is a function block diagram showing a detailed configuration of a control unit 280 in a terminal device 200 for telematics services according to an embodiment of the present invention.

In order to perform the above-described functions, the control unit 280 may include at least one of a service client module 281, a monitoring module 282, an audio-text conversion module 283, a dangerous driving detection module 284, a dangerous driving warning module 285, a vehicle interior environment management module 286, a driving prediction module 287, an eco index determination module 288, and a fuel efficiency comparison module 289 as shown in FIG. 4, and the above modules may be implemented as software, hardware, or a combination of software and hardware.

The service client module 281 may be connected to the third service device 400 to receive a message including a text from the third service device 400, or transmit a message including a created text to the third service device 400. Such a service client module 281 may be a client program provided from the third service device 400. For example, the service client module 281 may correspond to any one of a messenger program, an e-mail browsing program, and an SMS/MMS service program.

The monitoring module 282 may be operated in an audio-based service mode to determine generation of a user's voice and reception of the message including the text from the third service device 400 in accordance with a request of the user, particularly, an audio-based monitoring service start request. For this, the monitoring module 282 may be linked with the service client module 281 and the audio processing unit 250. For example, when a message is received from the service client module 281, the monitoring module 282 transmits the received message to the audio-text conversion module 283, and when a user's voice is converted into electrical signals to be applied through the audio processing unit 250, the monitoring module 282 transmits the applied electrical signals to the audio-text conversion module 283.

In addition, when the user's voice is input through the audio processing unit 250, the monitoring module 282 may further determine whether the input user's voice is a command for instructing a specific function, and when the input user's voice is the command, the monitoring module 282 may execute a function corresponding to the command.

Here, the command may be a command for instructing at least one of connection to the third service device 400, start of creation of a text, completion of creation of the text, reception of a message from the third service device 400, transmission of a message to the third service device 400, and completion of the audio-based service mode. Such a command may be set as at least one word related to a command to instruct, and may be set as default or arbitrarily set by a user.

In particular, when the user's voice is a command to instruct the creation of the text, the monitoring module 282 may control the user's voice generated until a command to instruct the completion of the creation of the text is generated, to be converted in the audio-text conversion module 283.

The audio-text conversion module 283 converts the determined user's voice into texts in accordance with control of the monitoring module 282 to provide the texts to the service client module 281, and converts a text included in the received message into audio data to transmit the audio data to the audio processing unit 250.

The dangerous driving detection module 284 analyzes vehicle information related to a vehicle driven by a user and environment information around the vehicle including image information about at least one direction with respect to the vehicle, and detects a lane departure of the vehicle by distinguishing an intended lane change and a lane departure due to inattention. More specifically, when a direction of the detected lane change or lane departure coincides with a direction of a turned on lamp of a turn signal lamp, it is determined as the intended lane change, and when the direction of the detected lane change or lane departure does not coincide with the direction of the turned on lamp or when a lane change or lane departure is detected in a state in which the turn signal lamp is not turned on, it is determined as the lane departure due to inattention, whereby the lane departure may be detected by distinguishing the intended lane change from the lane departure.

When the lane departure due to inattention is detected, the dangerous driving warning module 285 controls to notify a driver, passengers, or a driver of another vehicle of dangerous driving, and may control the vehicle electronic control device 100 so as to perform at least one of turning on of the turn signal lamp, power on of a radio inside a vehicle, volume up of the radio inside the vehicle, and operation of a vehicle wiper.

The vehicle interior environment management module 286 compares status information of the vehicle and a set temperature before a predetermined time from the driving start time predicted in the driving prediction module 287 and generates a temperature control signal, and the driving prediction module 287 is operated in accordance with an automatic adjustment request of the interior temperature of the vehicle input through the input unit 210 to predict the driving start time of the vehicle based on vehicle driving information of the user and provide the predicted driving start time to the vehicle interior environment management module 286.

Here, the driving pattern is one-time or repetitive vehicle driving information, and may be represented as time, week, and date information in which driving is performed as shown in FIG. 10. In an example of FIG. 10, a user may primarily drive a vehicle at rush hour, and as shown in FIG. 10, it can be seen that vehicle driving is performed over most of morning rush hour and evening rush hour, and a vehicle driving time is increased at Monday morning rush hour and Friday evening rush hour when a road congestion is severe. Based on such a driving pattern, on Monday, 7 a.m. to 6 p.m. is predicted as the driving start time, and on Tuesday to Friday, 8 a.m. to 6 p.m. is predicted as the driving start time. In addition, on Sunday, vehicle driving is performed between 10 a.m. to 11 a.m. in accordance with a personal schedule, and therefore 10 a.m. is predicted as the driving start time on Sunday.

Prediction of the driving start time based on the driving pattern may be performed in various methods, and several examples are given as follows.

For example, the driving prediction module 287 may collect driving history information including a driving time of a vehicle for a predetermined period of time, derive a repetitive driving pattern by analyzing the collected driving history information, and predict a driving start time from the derived driving pattern. Here, the driving history information may be collected in such a manner that the vehicle electronic control device 100 determines a point of time when the vehicle starts and a point of time when the vehicle stops for each driving and provides the determined point of time to the terminal device 200.

In this instance, the driving prediction module 287 may predict the driving start time by averaging the driving start time about at least one piece of driving history information generated in the same time zone among a plurality of pieces of driving history information collected in at least one unit of day, week, and month.

In another example, the driving prediction module 287 may derive a one-time or repetitive driving pattern from schedule information of the user, and predict the driving start time from a driving pattern. That is, the driving pattern may be derived based on a user's input or the schedule information stored in advance. For this, the schedule information may include whether vehicle driving is performed. FIG. 11 is a diagram showing an example of schedule information of the user from which the driving pattern is derived as shown in FIG. 10, and the user goes to work between about 8 a.m. and 9 a.m., business operation is performed between 9 a.m. to 6 p.m., and the user leaves the office between about 6 p.m. and 7 p.m. In the present embodiment, simple schedule information is shown, but in practice, schedule information may be provided in more specific and various forms. With reference to the schedule information, the driving prediction module 287 may predict 8 a.m. and 6 p.m. on Monday to Friday as the driving start time.

However, in real life, life is not formed in such a manner that the schedule information and the time accurately coincide with each other. Thus, there may occur slight errors in the stored schedule information and the actual driving start time.

In order to solve such errors, in another embodiment, the driving prediction module 287 may collect at least one piece of driving history information which is actually generated within a predetermined range at the driving start time of the driving pattern, and average the driving start time about the collected at least one piece of driving history information to thereby predict the driving start time. That is, based on the schedule information shown in FIG. 11, driving history information of before and after 8 a.m. and before and after 6 p.m. may be collected for a predetermined period of time. Based on the collected driving history information, the driving start time may be predicted. That is, the schedule is set as shown in FIG. 11, but morning rush hour may be earlier considering road conditions. In this case, the driving prediction module 287 may correct the driving start time predicted based on an actual driving history.

The fuel efficiency comparison module 288 may calculate fuel efficiency of a vehicle based on flow rate change information and driving distance information, generate fuel efficiency information including the calculated fuel efficiency value to transmit the generated fuel efficiency information to the vehicle service device 300, receive group information including the fuel efficiency information for each predetermined acquaintance group from the vehicle service device 300, and output fuel efficiency comparison information based on the received group information so that the user may recognize the output fuel efficiency comparison information.

Figure 5:
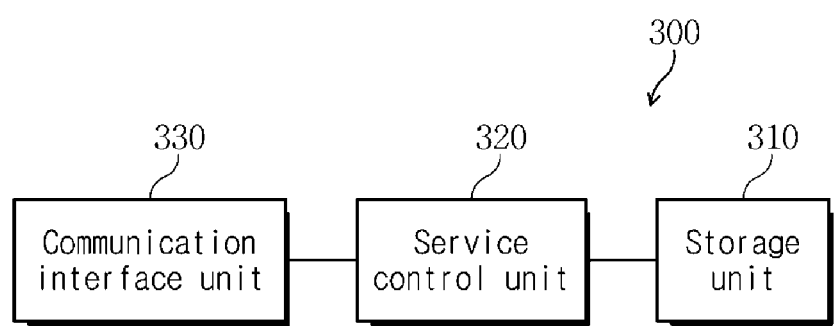
FIG. 5 is a block diagram showing a configuration of a vehicle service device for telematics services according to an embodiment of the present invention.

Next, FIG. 5 is a block diagram showing a configuration of a vehicle service device 300 for telematics services according to an embodiment of the present invention.

Referring to FIG. 5, the vehicle service device 300 may include a storage unit 310, a service control unit 320, and a communication interface unit 330.

The vehicle service device 300 is a device for supporting telematics services provided through the terminal device 200, and in particularly, the storage unit 310 of the present invention stores various data for telematics services. The communication interface unit 330 transmits and receives data by communicating with the terminal device 200, and the service control unit 320 performs various functions required for the terminal device 200 to provide the result.

For example, in the fourth embodiment of the present invention, the storage unit 310 stores a reference eco index for comparing an eco index and a comparison result of the eco index for each driving of the vehicle, and the service control unit 320 stores and manages the comparison result of the eco index received from the terminal device 200 for each driving of the vehicle. The service control unit 320 provides the stored result in accordance with a request of the terminal device 200. The communication interface unit 330 transmits the reference eco index related to a plurality of pieces of eco data in accordance with a driving status of the vehicle to the terminal device 200, and receives the comparison result of the eco index from the terminal device 200.

In addition, in the fifth embodiment of the present invention, the storage unit 310 stores acquaintance information for each predetermined acquaintance group through social network services or the like among subscribers of fuel efficiency comparison services and generates group information including the fuel efficiency information for each acquaintance group stored in the storage unit 310. The communication interface unit 330 receives the fuel efficiency information of the vehicle from the terminal devices 200 to provide the received information to the service control unit 320, and transmits the group information generated by the service control unit 320 to the terminal device 200 corresponding to the acquaintance group among the terminal devices 200.

The vehicle service device 300 may enable fuel efficiency comparison data obtained by comparing the fuel efficiency information for each acquaintance group to be included in the group information to thereby provide the group information, when transmitting the group information to the terminal device 200. In this case, the service control unit 320 may compare the fuel efficiency information of the vehicle for each acquaintance group to generate the fuel efficiency comparison data for each group.

The above-described vehicle service device 300 may be implemented as at least one server that is operated in a server-based computing method or a cloud method. In particular, the comparison result of the eco index with respect to the eco data may be provided through a cloud computing function through which the comparison result is permanently stored in a cloud computing device on the Internet. Here, the cloud computing may denote technologies that can service virtualized information technology (IT) resources, for example, hardware (server, storage, network, and the like), software (database, security, web server, and the like), services, data, and the like in an on demand method utilizing Internet technologies in a digital terminal device such as a desktop, a tablet computer, a notebook, a netbook, a smartphone, or the like.

Next, various embodiments of a telematics service method according to the present invention that is implemented based on the telematics service system configured as above will be described.

Figure 6:
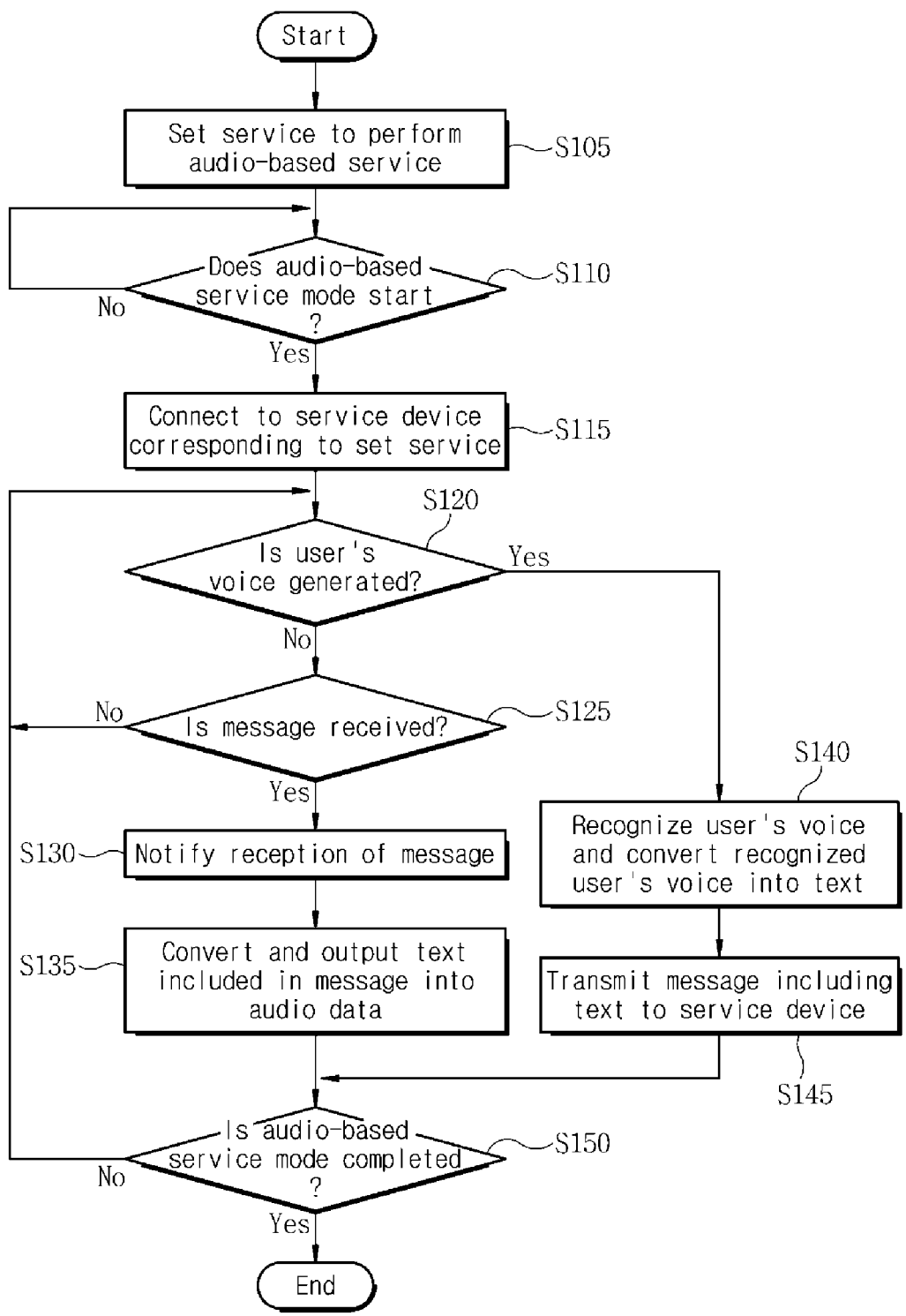
FIG. 6 is a flowchart showing a telematics service method according to a first embodiment of the present invention.
Figure 7:
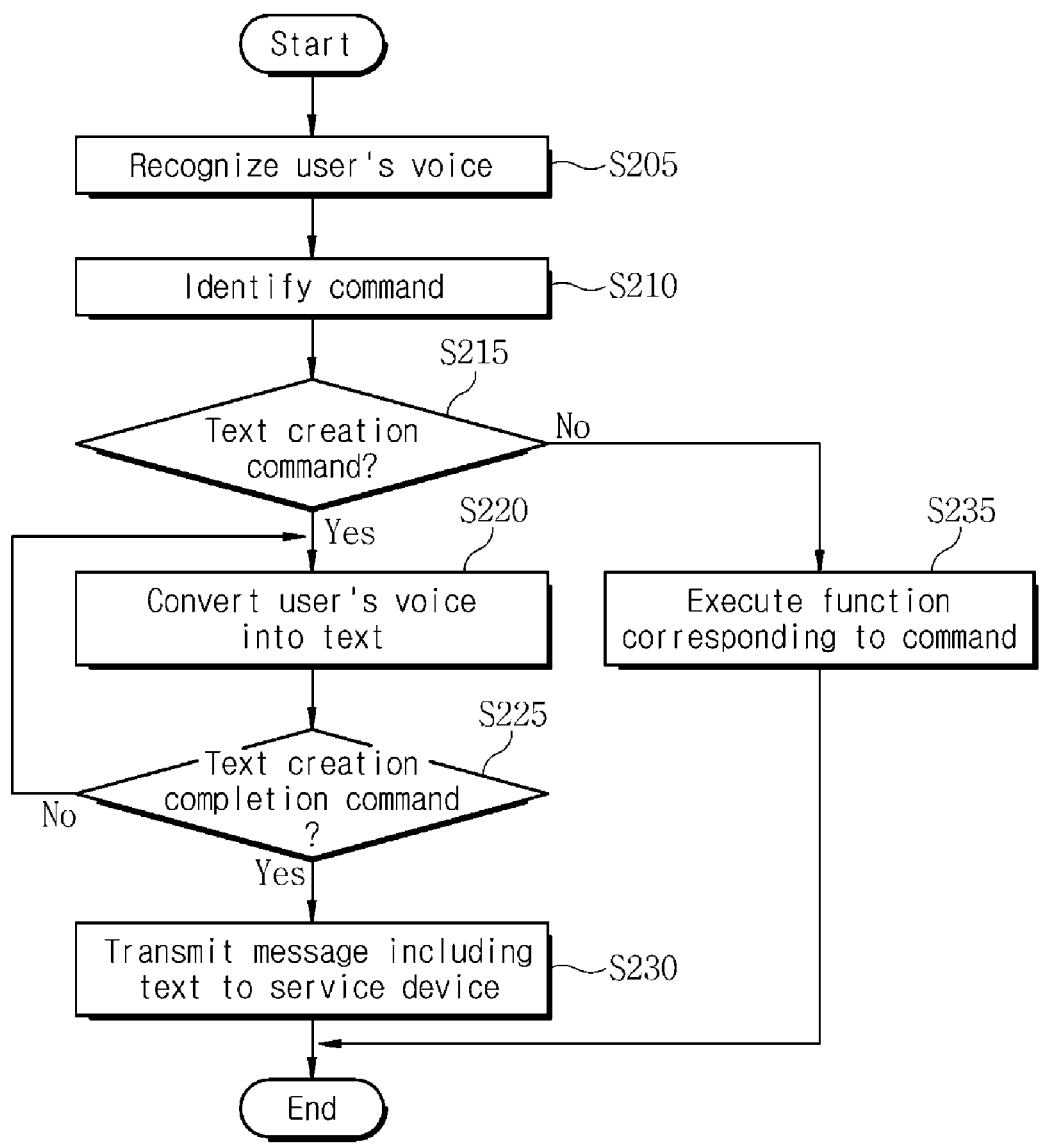
FIG. 7 is a flowchart showing, in more detail, a process for creating a text in a telematics service method according to a first embodiment of the present invention.

FIG. 6 is a flowchart showing a telematics service method according to a first embodiment of the present invention, and FIG. 7 is a flowchart showing, in more detail, a process for creating a text in a telematics service method according to a first embodiment of the present invention.

Referring to FIG. 6, in order to perform audio-based services, in operation S105, the terminal device 200 sets a service for transmitting and receiving a message in an audio-based service mode. For example, the terminal device 200 may set at least one service used by a user among mobile communication services including SMS and/or MMS, e-mail services, social network services (SNS), messenger services, and community services, as services to be provided as the audio-based services. Such setting may be performed in accordance with a request of the user, and particularly, connection information (for example, user account information, user ID, password, and the like) for the services may be set together. Here, the services that can be provided in the audio-based service mode are preferably services that can be used by the corresponding user in such a manner that the user signs up the services.

In operation S110, the terminal device 200 is operated in the audio-based service mode when a user request requesting the start of the audio-based service mode is input through the input unit 210.

In this instance, before the terminal device 200 is operated in the audio-based service mode, operation S115 is first performed. That is, in operation S115, the terminal device 200 determines whether the terminal device 200 is connected to the third service device 400 corresponding to the service set in operation S105, and is connected to the third service device 400 when the terminal device 200 is not connected to the third service device 400.

Next, the terminal device 200 is operated in the audio-based service mode, and monitors generation of a user's voice or reception of a message including a text from the third service device 400 through operations S120 and S125 while the terminal device 200 is operated in the audio-based service mode.

In operation S140, when the generation of the user's voice is determined in operation S120, the terminal device 200 recognizes a voice of the corresponding user and converts the recognized voice into a text through the audio-text conversion module 283. In operation S145, the terminal device 200 transmits the message including the converted text to the third service device 400 through the service client module 281.

When the reception of the message is determined in operation S125, the terminal device 200 proceeds to operation S130, notifies a user of the reception of the message. In operation S135, the terminal device 200 converts the text included in the received message into audio data to output the converted audio data as an audible sound. The notification of the reception of the message may be performed as a guidance message represented as audio data or in the form of outputting predetermined warning sound.

In operation S150, until a request for completion of the audio-based service mode is input, the audio-based service mode is maintained, and operations S120 to S145 may be repeatedly performed.

Meanwhile, a process of transmitting the audio-based message which is performed through operations S140 to S145 may be performed in more detail as shown in FIG. 7. That is, when the generation of the user's voice is determined in operation S120 of FIG. 6, the terminal device 200 recognizes the generated user's voice in operation S205 as shown in FIG. 7. For example, recognition of the user's voice may be performed in such a manner that an audio signal input through the audio processing unit 250 is analyzed, the analyzed audio signal is compared with a predetermined audio pattern, and which word the corresponding audio signal is matched with is determined.

In operation S210, based on the above-described voice recognition result, whether the user's voice is a command stored in advance is determined.

In operation S220, when the user's voice is a command to instruct to create a text based on the determination result, the terminal device 200 converts the user's voice generated until a command to instruct to complete the creation of the text is generated, into a text.

In operation S230, when a user's voice corresponding to the command to instruct to complete the creation of the text is input in operation S225, the terminal device 200 transmits a message including the text created in operation S230 to the third service device 400.

On the contrary, in operation S230, when the determined command is another command which is different from the command to instruct to create the text in operation S215, the terminal device 200 may perform a function corresponding to the determined command. More specifically, the terminal device 200 may receive a new message, transmit a message created in advance, or complete the audio-based service mode in the corresponding command by requesting from the third service device 400.

As described above, as the telematics services according to the present invention, audio-based message services while driving of a user, particularly, a driver may be provided, thereby promoting safe driving and convenience of the user.

Figure 8:
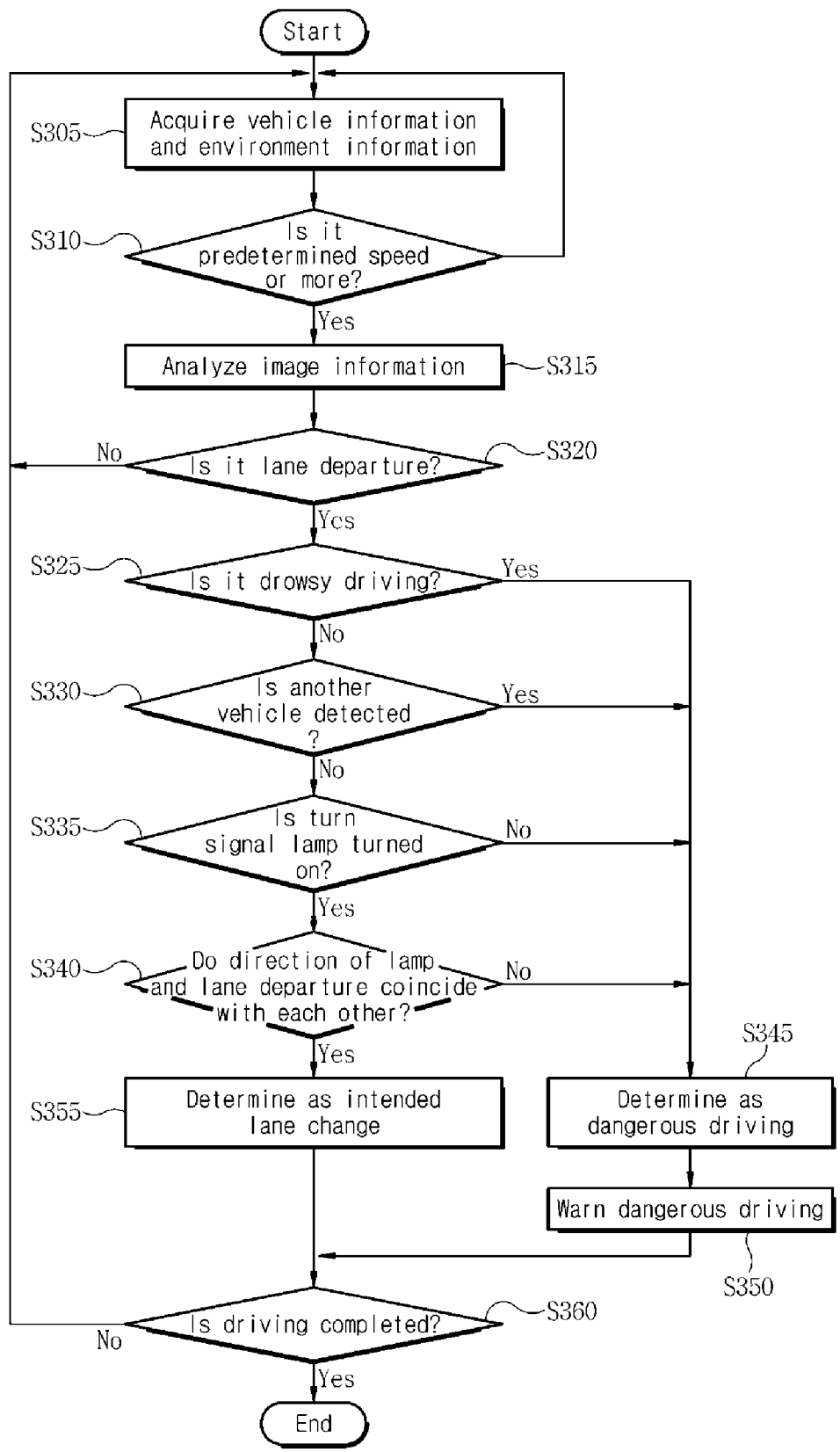
FIG. 8 is a flowchart showing a telematics service method according to a second embodiment of the present invention.

FIG. 8 is a flowchart showing a telematics service method according to a second embodiment of the present invention.

The terminal device 200 acquires vehicle information and environment information collected through the camera unit 120 and the sensor unit 130 of the vehicle electronic control device 100 or through the camera unit 260 and the sensor unit 270 of the terminal device 200 in operation S305, and determines whether a movement speed of a vehicle is a predetermined speed or more in operation S310. Through this, only when the movement speed is more than the predetermined speed, the terminal device 200 may monitor whether a lane departure is performed, and therefore in a case other than a case in which the vehicle is parked or driven on the road, warning due to a lane departure is not performed.

The terminal device 200 analyzes image information about at least one direction with respect to a vehicle included the environment information around the vehicle in operation S315 when the movement speed of the vehicle is the predetermined speed or more. In operation S325, when the lane departure and the lane change is detected in operation S320, the terminal device 200 analyzes pupil movement from the image information of the driver included in the environment information around the vehicle, and determines whether a movement of eyes does not occur for a predetermined period of time. In operation S345, when it is determined as drowsy driving during which the movement of the eyes does not occur for a predetermined period of time, the terminal device 200 determines that the driver is in a dangerous driving state.

In operation S345, when another vehicle is detected in the same direction as a direction of a lane departure based on the analyzed result of the image information included in the environment information around the vehicle even without drowsy driving in operation S330, the terminal device 200 determines that the driver is in a dangerous driving state.

In operation S345, even in a case in which another vehicle is not detected in the same direction as the direction of the lane departure based on the analyzed result of the image information included in the environment information without drowsy driving, when a turn signal lamp is not turned on in operation S335 or when a direction of the turn signal lamp does not coincide with the direction of the lane departure in operation S340, the terminal device determines that the driver is in a dangerous driving state.

In a case in which the turn signal lamp is not properly turned on, other vehicles cannot take notice when a lane change is performed, and therefore warning may be performed by displaying a warning message or turning on an emergence lamp so that the driver and drivers of other vehicles can pay attention to the warning.

In operation S350, when the driver is determined to be in the dangerous driving state, the terminal device 200 may notify the driver, passengers, or a driver of another vehicle of the dangerous driving by controlling the vehicle electronic control device to perform at least one of turning on an emergency lamp of the vehicle, power on of a radio inside the vehicle, volume up of the radio inside the vehicle, and operation of a vehicle wiper.

Meanwhile, in operation S355, when another vehicle is not detected in the same direction as the direction of the lane departure without drowsy driving, and the direction of the turned on lamp of the turn signal lamp and the direction of the lane departure coincide with each other, the terminal device 200 may determine that the lane departure is an intended lane change. In addition, the terminal device 200 determines the driving status of the vehicle through the vehicle status information collected through the vehicle electronic control device 100, and monitors the lane departure by continuously acquiring the vehicle information and the environment information when the driving status is not completion of the driving of the vehicle in operation S360.

According to the second embodiment of the present invention, dangerous driving service may be provided as the telematics service, and particularly, the lane change or the lane departure due to drowsy driving or inattention of the driver while driving of the vehicle may be detected to perform a warning, so that the driver may safely drive the vehicle.

Figure 9:
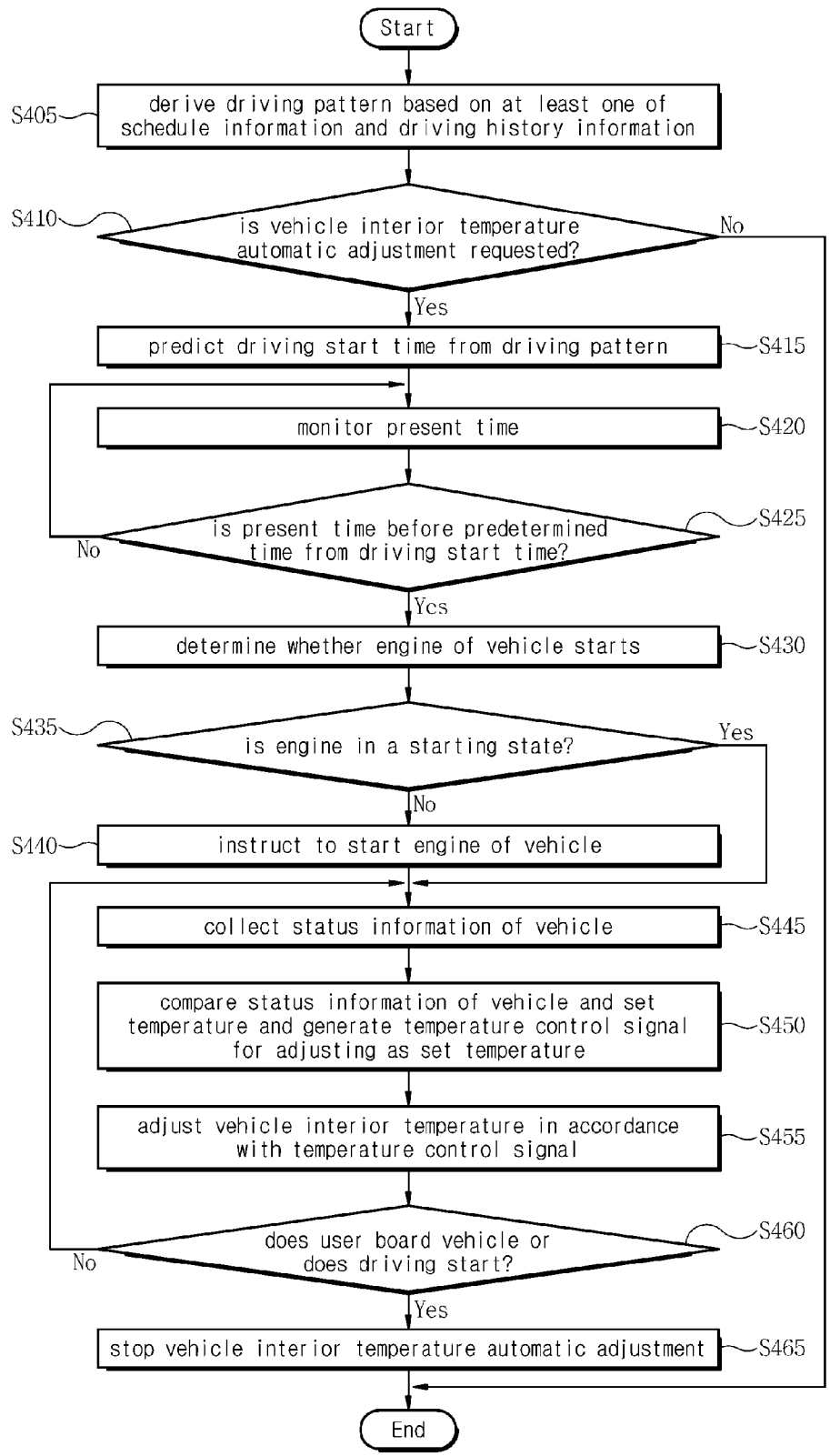
FIG. 9 is a flowchart showing a telematics service method according to a third embodiment of the present invention.

FIG. 9 is a flowchart showing a telematics service method according to a third embodiment of the present invention.

Referring to FIG. 9, in operation S405, the terminal device 200 derives a driving pattern of the user as shown in FIG. 10 based on at least one of the schedule information of the user and the driving history information of the vehicle shown in FIG. 11 before the vehicle interior automatic temperature adjustment is performed. More specifically, as described above, in an embodiment of the present invention, a one-time or repetitive driving pattern may be derived by performing statistical treatment on at least one piece of driving history information generated in the same time zone, among a plurality of pieces of driving history information collected in at least one unit of day, week, and month.

In addition, beyond the above-described method, according to the present invention, a basic driving pattern may be derived from the schedule information of the user, at least one piece of driving history information actually generated within a predetermined range may be collected, the statistical treatment may be performed on the collected at least one piece of driving history information, thereby deriving the one-time or repetitive driving pattern.

Next, in operation S415, when an automatic adjustment request for the vehicle interior temperature is generated in operation S410, the terminal device 200 predicts the driving start time of the vehicle based on the driving pattern of the user which has been derived and stored. Here, the automatic adjustment request for the vehicle interior temperature may be determined based on whether a mode for performing the vehicle interior temperature automatic adjustment function is set.

Meanwhile, unlike the above description, operation S415 may be performed immediately after the driving pattern is derived in operation S405 regardless of the automatic adjustment request for the vehicle interior temperature.

Next, the terminal device 200 may monitor a present time in operation S420, and determine whether the current time is before a predetermined time from the predicted driving start time in operation S425.

Here, the predetermined time may be set as sufficient time for the vehicle interior temperature to be adjusted as a set temperature, and for example, may be set within a range of several minutes or several tens of minutes. However, here, as a time during which the vehicle waits in a state of starting the vehicle before driving of the vehicle is increased, unnecessary waste of fuel and air pollution may be caused, and therefore the predetermined time is preferably set appropriately.

When the present time is before the predetermined time from the predicted driving start time, control of the interior temperature of the vehicle is performed. In this instance, control of the interior temperature of the vehicle is possible only when the vehicle starts. Thus, the terminal device 200 may determine whether the vehicle starts in operation S430, and instruct to start the vehicle in operation S440 when the vehicle does not start in operation S435. By the instruction of the terminal device 200, the vehicle electronic control device 100 may control the starting device 11 so that the vehicle starts.

In operation S445, when the corresponding vehicle starts, the terminal device 200 collects the status information of the vehicle. The status information of the vehicle may be collected in such a manner that the vehicle electronic control device 100 provides the status information of the vehicle including the interior temperature of the vehicle to the terminal device 200.

Next, the terminal device 200 generates a temperature control signal for controlling the interior temperature of the vehicle so that the interior temperature of the vehicle reaches a set temperature by comparing the collected status information of the vehicle and the set temperature in operation S450, and the vehicle electronic control device 100 that has received the generated temperature control signal controls the vehicle temperature adjustment device 320 to thereby adjust the vehicle interior temperature in operation S455. In this instance, the temperature control signal may include a temperature adjustment command and the set temperature, or may include a driving command of a heater or an air conditioner of the vehicle temperature adjustment device 12. The vehicle electronic control device 100 may drive the heater or the air conditioner of the vehicle temperature adjustment device 12 in accordance with the temperature control signal, or drive the heater or the air conditioner of the vehicle temperature adjustment device 12 by setting a target temperature of the air conditioner or the heater as the set temperature.

Meanwhile, after the driver boards the vehicle or driving of the vehicle starts, the temperature adjustment is possible by the driver of the vehicle, and therefore the vehicle interior temperature automatic adjustment may be unnecessary.

Thus, in the present invention, the terminal device 200 determines whether the driver boards the vehicle and the driving start time of the vehicle directly or through the vehicle electronic control device 100 in operation S460, and when the driver does not board the vehicle or the driving of the vehicle does not start, the terminal device 200 repeatedly performs the above described operations S145 to S155 to thereby adjust the vehicle interior temperature to be the set temperature. On the contrary, when the driver boards the vehicle or the driving of the vehicle starts, the terminal device 200 stops the vehicle interior temperature automatic adjustment function in operation S465. Thereafter, the interior temperature of the vehicle may be adjusted manually by the driver of the vehicle.

As the telematics services as shown in the third embodiment of the present invention, the vehicle interior temperature automatic adjustment services based on schedule of the user may be provided, thereby improving convenience of the user who boards the vehicle.

Figure 12:
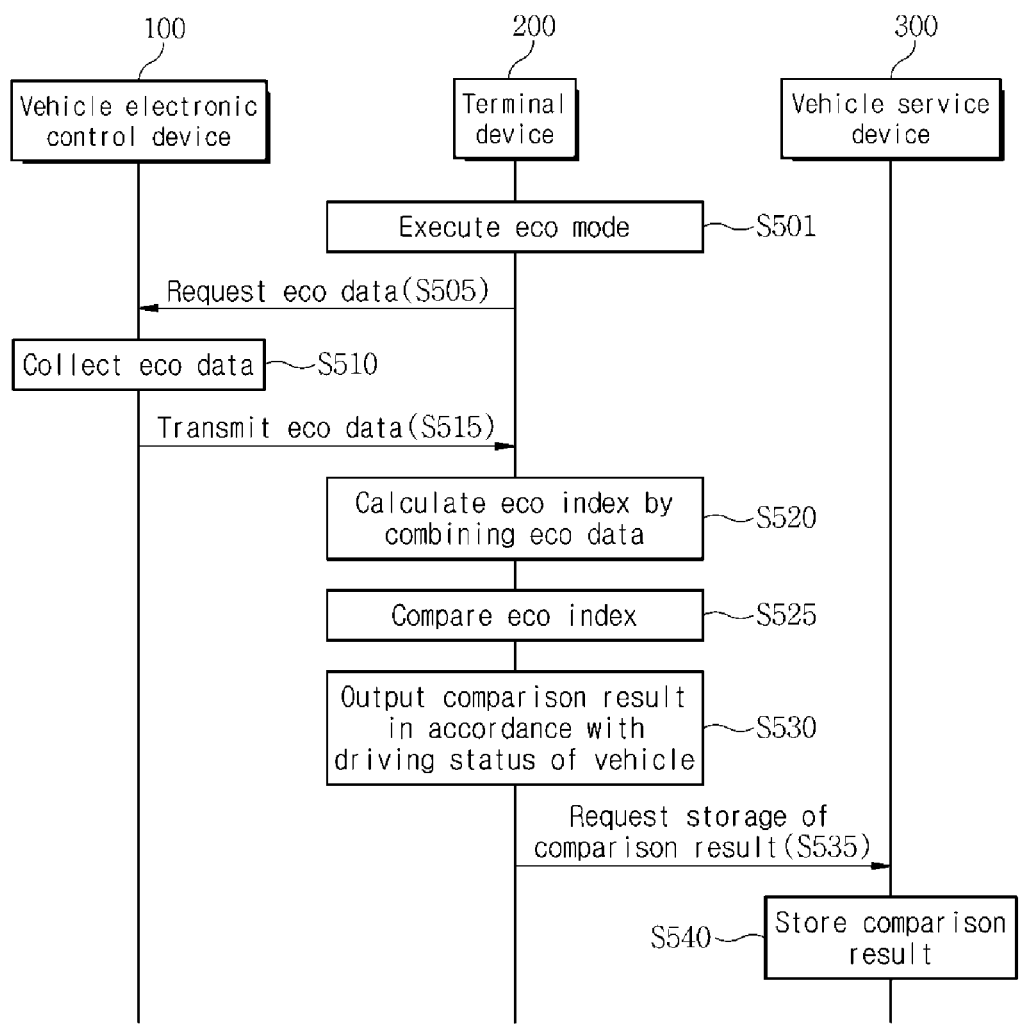
FIG. 12 is a data flowchart showing a telematics service method according to a fourth embodiment of the present invention.

FIG. 12 is a data flowchart showing a telematics service method according to a fourth embodiment of the present invention.

Referring to FIG. 12, in operation S501, the terminal device 200 executes an eco mode through an eco application. The terminal device 200 requests eco data from the vehicle electronic control device 100 in operation S505. In this instance, the terminal device 200 may be connected to the vehicle electronic control device 100 through local wireless communication or wired communication using cable. Next, in operation S510, the vehicle electronic control device 100 collects a plurality of pieces of eco data.

When the eco data is collected, the vehicle electronic control device 100 transmits the collected eco data to the terminal device 200. Here, the terminal device 200 receives the eco data which is separated depending on a driving status of the vehicle such as before driving of the vehicle, while driving of the vehicle, stoppage while driving, or completion of driving of the vehicle. That is, the eco data is information indicating a status of the vehicle related to economical driving. For example, the terminal device 200 may receive, from the vehicle electronic control device 100, the eco data for economical driving such as whether preheating of an engine is performed, whether sudden start is performed, whether sudden braking is performed, whether inertia driving is performed, an air pressure of a tire, whether cruise control is performed, whether an economical speed is maintained, an idling time, a load weight, whether an air conditioner is used, whether a heater is used, a vehicle supplies status, and the like in accordance with the driving status of the vehicle.

In operation S520, the terminal device 200 calculates an eco index by combining the eco data. In this instance, the terminal device 200 applies a numerical value distinguished depending on the importance of vehicle driving to each received eco data, and combines the eco data in accordance with the applied numerical value to determine the eco index. That is, the terminal device 200 may separate the importance of the eco data depending on the driving status of the vehicle as numerical values, and determine the eco index in accordance with the separated numerical values. Here, the eco index may be data obtained by grading a degree of economical driving with respect to driving of the vehicle.

In operation S525, the terminal device 200 compares the eco index calculated by analyzing the eco data received through the vehicle electronic control device 100 and a predetermined reference eco index. Here, the terminal device 200 may receive the reference eco index from the vehicle service device 300 in accordance with execution of the eco application.

As shown in Table 1, the terminal device 200 compares the eco index with respect to the eco data received from the vehicle electronic control device 100 and the predetermined reference eco index in accordance with the driving status of the vehicle to thereby provide a comparison result, and set a score with respect to the comparison result.

TABLE 1

| Eco data list | Eco index | Reference eco index | Comparison result | Score |
| --- | --- | --- | --- | --- |
| Whether preheating is performed | 0.1 | 1 | Need of improvement | 30 |
| Whether sudden start is performed | 0 | 0 | Very good | 100 |
| Whether sudden braking is performed | 0.5 | 0 | Good | 80 |
| Whether inertia driving is performed | 0.5 | 1 | Good | 80 |
| air pressure of tire | 1 | 1 | Very good | 100 |
| whether cruise control is performed | 1 | 1 | Very good | 100 |
| whether economical speed is maintained | 1 | 1 | Very good | 100 |
| idling time | 0.2 | 0 | good | 90 |
| load weight | 0.2 | 0 | good | 90 |
| whether air conditioner is used | 0.5 | 1 | Need of improvement | 50 |
| whether heater is used | 0 | 1 | Very good | 100 |
| vehicle supplies status | 1 | 1 | Very good | 100 |

The terminal device 200 generates the comparison result by comparing index information in accordance with the vehicle status of the vehicle as shown in Table 1.

Next, the terminal device 200 outputs the comparison result in accordance with the driving status of the vehicle in operation S530.

In this instance, when the driving status of the vehicle is before driving, the terminal device 200 outputs a comparison result of an eco index with respect to a previous boarding history of the vehicle and eco data corresponding to an engine preheating time, vehicle supplies status, and the like. In addition, when the driving status of the vehicle is while driving, the terminal device 200 extracts eco data corresponding to whether sudden start is performed, whether sudden braking is performed, whether inertia driving is performed, whether cruise control is performed, whether an economical speed is maintained, whether an air conditioner is used, whether a heater is used, or the like, which are related to driving of the vehicle, and outputs a comparison result of an eco index of the extracted eco data. In this instance, since the driving status of vehicle is while driving, the terminal device 200 may provide only minimum eco data required for driving. In addition, when the driving status of the vehicle is stoppage while driving, the terminal device 200 extracts eco data corresponding to whether inertia driving is performed, whether cruise control is performed, whether an economical speed is maintained, whether an air conditioner is used, and whether a heater is used, which are applied or collected between driving of the vehicle, and outputs a comparison result of an eco index with respect to the extracted eco data as audio data through the audio-text conversion module 283 or outputs the comparison result. In addition, when the driving status of the vehicle is completion of the driving because the vehicle arrives at a destination, the terminal device 200 outputs the comparison result of the eco index with respect to the eco data corresponding to whether sudden start is performed, whether sudden braking is performed, whether inertia driving is performed, whether cruise control is performed, whether an economical speed is maintained, whether an air conditioner is used, whether a heater is used, an air pressure of a tire, an idling time, a load weight, and a vehicle supplies status, which are related to a driving path of the vehicle.

Next, the terminal device 200 requests storage of the comparison result of the eco index in accordance with the driving status of the vehicle from the vehicle service device 300 in accordance with a request of the user in operation S535. Thus, the vehicle service device 300 manages the comparison result of the eco index received from the terminal device 200. In this instance, the vehicle service device 300 stores the comparison result of the eco index for each driving of the vehicle in operation S540.

As shown in Table 2, the vehicle service device 300 may separate the comparison result of the eco index of the vehicle for each driving of the vehicle and stores the separated comparison result.

TABLE 2

| Date | Driving course | Driving distance | Result | Score |
|------|----------------|------------------|--------|-------|
| June 1 | Home-office | 15 km | Good | 85 |
| June 6 | Home-Sokcho | 300 km | Very good | 95 |
| July 8 | Office-market | 5 km | Need of improvement | 50 |

The vehicle service device 300 separates the comparison result of the eco index of the vehicle for each driving of the vehicle as shown in Table 2 and stores the separated comparison result. Next, the vehicle service device 300 may provide the stored result in accordance with a request of the terminal device 200. Thus, the terminal device 200 may download and output the comparison result of the eco index managed through the vehicle service device 300, as necessary.

Thus, the comparison result of the eco index with respect to the eco data collected in accordance with the driving status of the vehicle may be provided to the user, thereby promoting safe driving. In addition, economical driving information may be allowed to be recognized by drivers, a driving or starting habit of the user may be changed toward a more economical direction. In addition, a plurality of pieces of eco data may be notified to drivers through TTS functions while present driving information or start information are displayed, thereby providing information about an optimized driving condition to the drivers in real time.

Figure 13:
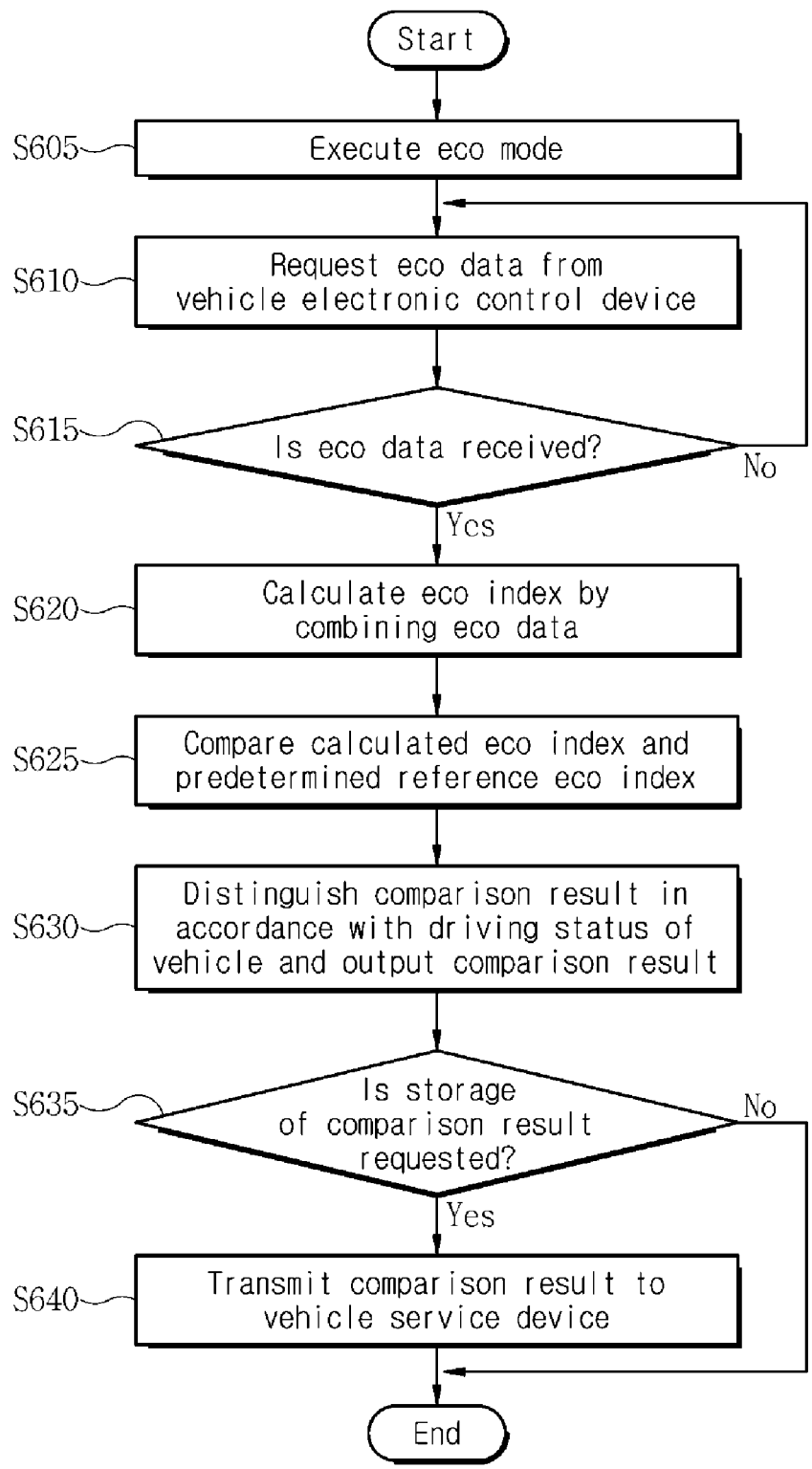
FIG. 13 is a flowchart showing, in more detail, operations of a terminal device in a telematics service method according to a fourth embodiment of the present invention.

FIG. 13 is a flowchart showing, in more detail, operations of a terminal device in a telematics service method according to a fourth embodiment of the present invention.

Referring to FIG. 13, the terminal device 200 according to an embodiment of the present invention executes an eco mode through an eco application through the control unit 280 in operation S605. Next, the control unit 280 requests the eco data from the vehicle electronic control device 100 in operation S610. In this instance, the control unit 280 may be connected to the vehicle electronic control device 100 through local wireless communication or wired communication using cable. Thereafter, the vehicle electronic control device 100 collects a plurality of pieces of eco data and provides the collected eco data to the terminal device 200.

Next, the control unit 280 determines whether the eco data is received in operation S615. Here, the control unit 280 receives the eco data which is separated depending on the driving status of the vehicle such as before driving of the vehicle, while driving of the vehicle, stoppage while driving, or completion of driving of the vehicle. That is, the eco data is information indicating a status of the vehicle related to economical driving. For example, the control unit 280 may receive, from the vehicle electronic control device 100, the eco data for economical driving such as whether preheating of an engine is performed, whether sudden start is performed, whether sudden braking is performed, whether inertia driving is performed, an air pressure of a tire, whether cruise control is performed, whether an economical speed is maintained, an idling time, a load weight, whether an air conditioner is used, whether a heater is used, a vehicle supplies status, and the like in accordance with the driving status of the vehicle.

When the eco data is received, the control unit 280 calculates an eco index by combining the eco data in operation S620. In this instance, the control unit 280 applies a numerical value distinguished depending on the importance of vehicle driving to each received eco data, and determines the eco index in accordance with the separated numerical values. Here, the eco index may be data obtained by grading a degree of economical driving with respect to driving of the vehicle. Meanwhile, when the eco data is not received, the control unit 280 re-requests transmission of the eco data from the vehicle electronic control device 100.

In addition, the control unit 280 compares the eco index calculated by analyzing the eco data received through the vehicle electronic control device 100 and a predetermined reference eco index in operation S625. Here, the control unit 280 may receive the reference eco index from the vehicle service device 300 in accordance with execution of the eco application.

Next, the control unit 280 outputs the comparison result in accordance with the driving status of the vehicle in operation S630.

In this instance, when a driving status of the vehicle is before driving of the vehicle, the control unit 280 outputs a comparison result of an eco index with respect to a previous boarding history of the vehicle and eco data corresponding to an engine preheating time or vehicle supplies status. In addition, when the status information of the vehicle is while driving of the vehicle, the control unit 280 extracts eco data corresponding to whether sudden start is performed, whether sudden braking is performed, whether inertia driving is performed, whether cruise control is performed, whether an economical speed is maintained, whether an air conditioner is used, whether a heater is used, or the like, which are related to driving of the vehicle, and outputs a comparison result with respect to an eco index of the extracted eco data. In this instance, since the vehicle is in a driving state, the control unit 280 may provide only minimum eco data required for driving. In addition, when the driving status of the vehicle is stoppage while driving, the control unit 280 extracts eco data corresponding to whether inertia driving is performed, whether cruise control is performed, whether an economical speed is maintained, whether an air conditioner is used, and whether a heater is used, which are applied or collected between driving of the vehicle, and outputs a comparison result of an eco index with respect to the extracted eco data. In addition, when the driving status of the vehicle is completion of the driving because the vehicle arrives at a destination, the control unit 280 outputs a comparison result of an eco index with respect to eco data corresponding to whether sudden start is performed, whether sudden braking is performed, whether inertia driving is performed, whether cruise control is performed, whether an economical speed is maintained, whether an air conditioner is used, whether a heater is used, an air pressure of a tire, an idling time, a load weight, and a vehicle supplies status, which are related to a driving path of the vehicle.

The control unit 280 determines whether the storage of the comparison result of the eco index in accordance with the driving status of the vehicle is requested in operation S635. When the storage is requested based on the comparison result, the control unit 280 transmits the comparison result of the eco index in accordance with the driving status of the vehicle to the vehicle service device 300 in operation S640. Thus, the control unit 280 may download and output the comparison result of the eco index managed through the vehicle service device 300, as necessary.

Figure 14:
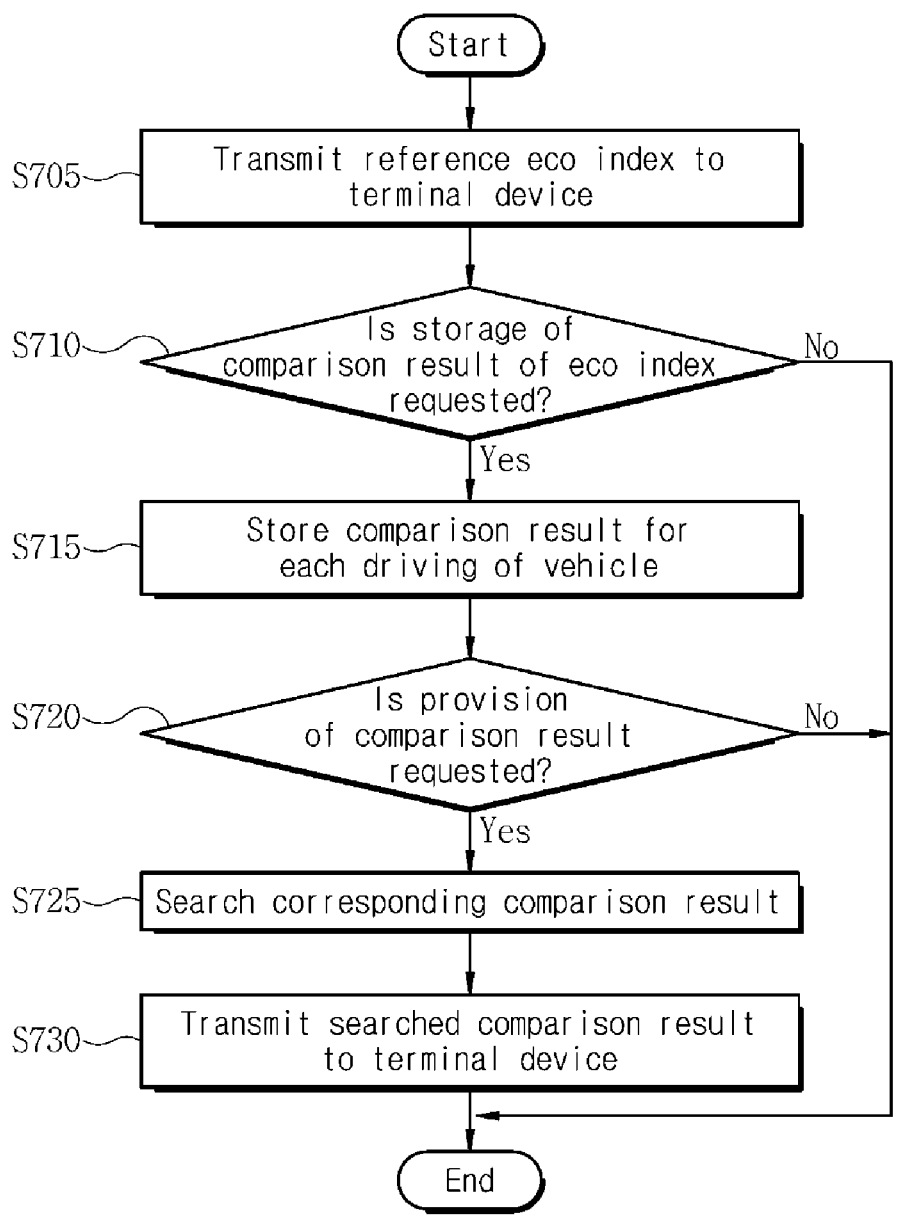
FIG. 14 is a flowchart showing, in more detail, operations of a vehicle service device in a telematics service method according to a fourth embodiment of the present invention.

FIG. 14 is a flowchart showing, in more detail, operations of a vehicle service device in a telematics service method according to a fourth embodiment of the present invention.

Referring to FIG. 14, the service control unit 320 of the vehicle service device 300 according to the fourth embodiment of the present invention transmits the reference eco index to the terminal device 200 in accordance with execution of the eco application of the terminal device 200 in operation S705. Next, the service control unit 320 determines whether storage of the comparison result of the eco index is requested in operation S710.

When the storage of the comparison result is requested, the service control unit 320 stores and manages the comparison result of the eco index received from the terminal device 200. In this instance, the service control unit 320 stores the comparison result of the eco index for each driving of the vehicle in operation S715.

The service control unit 320 determines whether provision of the stored comparison result is requested from the terminal device 200 in operation S720. When the provision of the comparison result is requested, the service control unit 320 searches a corresponding comparison result in operation S725. Next, the service control unit 320 transmits the searched comparison result to the terminal device 200 in operation S730.

As described above, as the telematics services in the fourth embodiment of the present invention, services which can induce economical driving may be provided.

Figure 15:
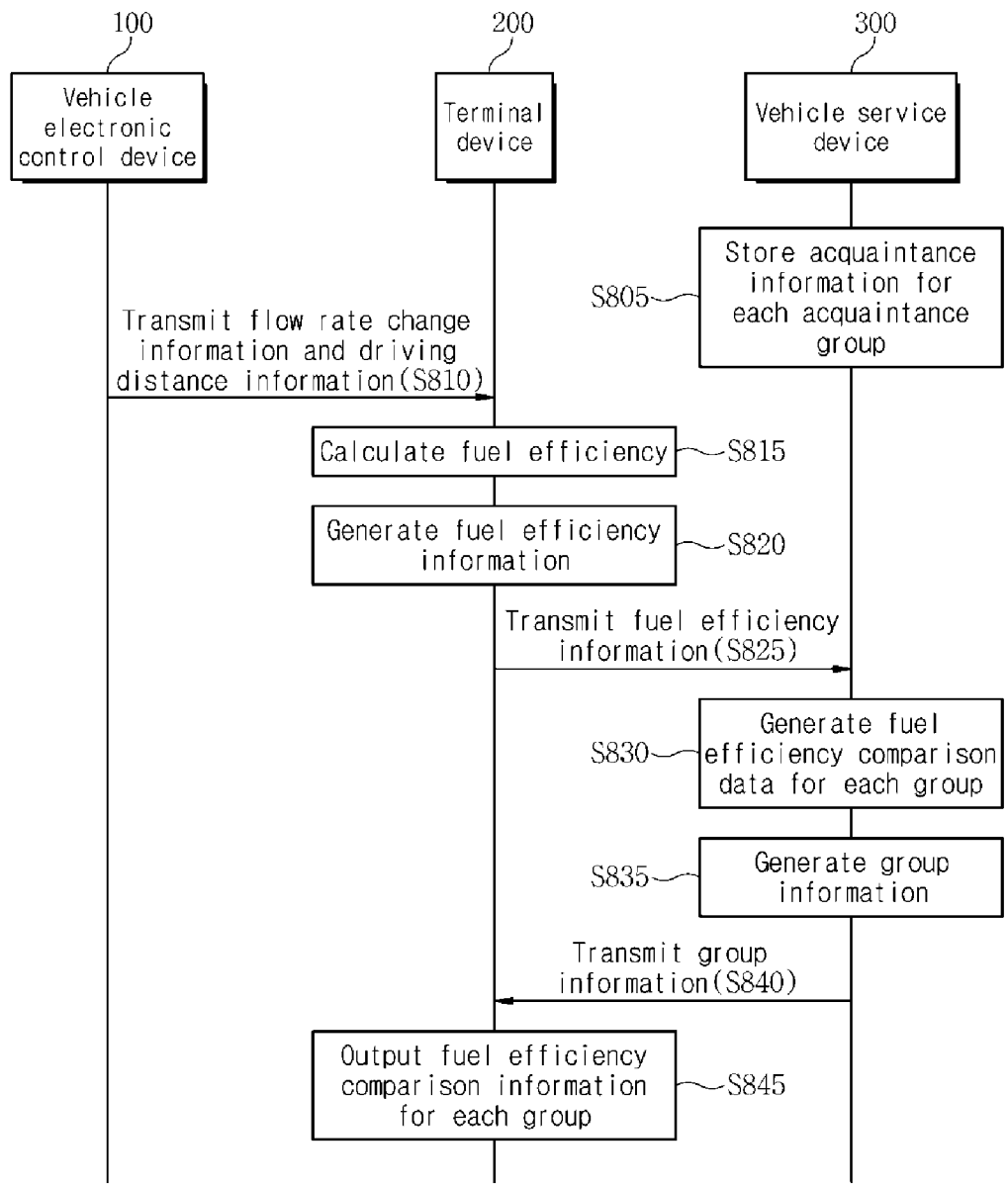
FIG. 15 is a message flowchart showing a telematics service method according to a fifth embodiment of the present invention.

FIG. 15 is a message flowchart showing a telematics service method according to a fifth embodiment of the present invention.

Referring to FIG. 15, in operation S805, the vehicle service device 300 stores acquaintance information for each predetermined acquaintance group through social network services or the like among subscribers of the services, in conjunction with the third service device 500. For example, the acquaintance information may include identification information, a group name, and the like of the terminal device 200.

Meanwhile, the vehicle electronic control device 100 detects a flow rate of the vehicle through the flow rate detection sensor 135, and detects a driving distance of the vehicle through the driving distance detection sensor 136. Next, the vehicle electronic control device 100 generates flow rate change information of the vehicle by calculating a degree of change in the flow rate detection value transmitted from the flow rate detection sensor 135, and transmits the generated flow rate change information to the terminal device 200. In addition, the vehicle electronic control device 100 transmits a driving distance detection value transmitted from the driving distance detection sensor 136 to the terminal device 200 in operation S810.

When receiving the flow rate change information and the driving distance information from the vehicle electronic control device 100, the terminal device 200 provides the received information to the fuel efficiency comparison module 289, and the fuel efficiency comparison module 289 calculates fuel efficiency of the vehicle based on the flow rate change information and the driving distance information in operation S815.

Next, the fuel efficiency comparison module 289 of the terminal device 200 generates the fuel efficiency information including the calculated fuel efficiency value in operation S820, and transmits the generated information to the vehicle service device 300 in operation S825.

In operation S830, the vehicle service device 300 receives the fuel efficiency information of the vehicle from a plurality of terminal devices 200, and generates fuel efficiency comparison data obtained by comparing the fuel efficiency information of the vehicle for each acquaintance group stored in operation S805. Next, in operation S835, the vehicle service device 300 generates group information including the fuel efficiency information of the vehicle for each acquaintance group and the fuel efficiency comparison data for each group in operation S835.

Next, the vehicle service device 300 transmits the generated group information to the terminal device 200 corresponding to the acquaintance group among the terminal devices 200 in operation S840.

Next, the fuel efficiency comparison module 289 of the terminal device 200 receives the group information transmitted from the vehicle service device 300, and outputs the fuel efficiency comparison information for each group based on the group information, so that the user may recognize the output fuel efficiency comparison information in operation S845.

Figure 16:
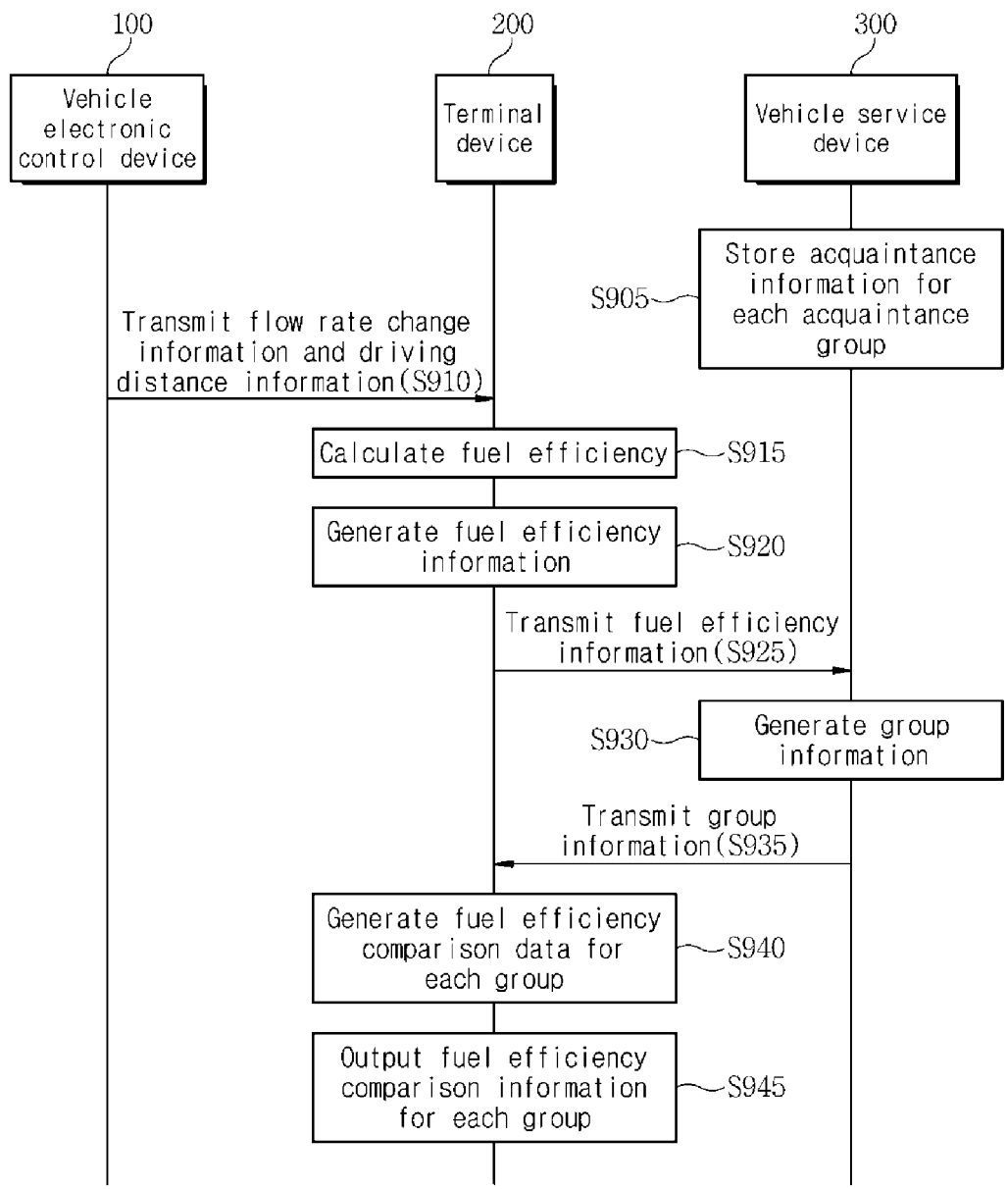
FIG. 16 is a message flowchart showing a modification example of a telematics service method according to a fifth embodiment of the present invention.

FIG. 16 is a message flowchart showing a modification example of a telematics service method according to a fifth embodiment of the present invention. Here, generation of the fuel efficiency comparison data for each group may be performed by the terminal device 200.

Referring to FIG. 16, the vehicle service device 300 stores acquaintance information for each predetermined acquaintance group through social network services or the like among subscribers of the services in conjunction with the third service device 400 in operation S905. For example, the acquaintance information may include identification information, a group name, and the like of the terminal device 200.

Meanwhile, the vehicle electronic control device 100 detects a flow rate of the vehicle through the flow rate detection sensor 135, and detects a driving distance of the vehicle through the driving distance detection sensor 136. Next, the vehicle electronic control device 100 generates flow rate change information of the vehicle by calculating a degree of change in the flow rate detection value transmitted from the flow rate detection sensor 135, and transmits the generated flow rate change information to the terminal device 200. In addition, the vehicle electronic control device 100 transmits a driving distance detection value transmitted from the driving distance detection sensor 136 to the terminal device 200 in operation S910.

When receiving the flow rate change information and the driving distance information from the vehicle electronic control device 100, the terminal device 200 provides the received information to the fuel efficiency comparison module 289, and the fuel efficiency comparison module 289 calculates fuel efficiency of the vehicle based on the flow rate change information and the driving distance information in operation S915.

Next, the fuel efficiency comparison module 289 of the terminal device 200 generates the fuel efficiency information including the calculated fuel efficiency value in operation S920, and transmits the generated information to the vehicle service device 300 in operation S925.

In operation S930, the vehicle service device 300 receives the fuel efficiency information of the vehicle from a plurality of terminal devices 200, and generates group information including the fuel efficiency information of the vehicle for each acquaintance group stored in operation S905. Next, in operation S935, the vehicle service device 300 transmits the generated group information to the terminal device 200 corresponding to the acquaintance group among the terminal devices 200.

Next, the fuel efficiency comparison module 289 of the terminal device 200 receives the group information transmitted from the vehicle service device 300, generates fuel efficiency comparison data for each group by comparing the fuel efficiency information of the vehicle included in the received group information for each acquaintance group in operation S940, and outputs the fuel efficiency comparison information for each group including the fuel efficiency comparison data and the fuel efficiency information of the vehicle for each acquaintance group so that the user may recognize the output information in operation S945.

As described above, in the fifth embodiment of the present invention, telematics services for comparing and sharing the fuel efficiency information of a plurality of acquaintances and a user may be provided, thereby inducing economical driving of a driver through sharing of the fuel efficiency information.

The telematics service methods according to various embodiments of the present invention may be implemented in the form of software readable by various computer means and recorded in a computer-readable recording medium. The computer-readable recording medium may separately include program commands, local data files, local data structures, etc. or include a combination of them. The medium may be specially designed and configured for the present invention, or known and available to those of ordinary skill in the field of computer software. Examples of the computer-readable recording medium include magnetic media, such as a hard disk, a floppy disk, and a magnetic tape, optical media, such as a CD-ROM and a DVD, magneto-optical media, such as a floptical disk, and hardware devices, such as a ROM, a RAM, and a flash memory, specially configured to store and perform program commands. Examples of the program commands may include high-level language codes executable by a computer using an interpreter, etc. as well as machine language codes made by compilers. Such a hardware apparatus may be configured to operate in one or more software modes, or vice versa in order to perform the operation of the present invention.

While the invention has been shown and described with reference to certain exemplary embodiments thereof, it will be understood by those skilled in the art that various changes in form and details may be made therein without departing from the spirit and scope of the invention as defined by the appended claims.

INDUSTRIAL APPLICABILITY

An apparatus and method for telematics services according to an embodiment of the present invention may enable a terminal device which a user possesses to be linked with a vehicle electronic control device mounted in a vehicle to provide telematics services related to the vehicle, and therefore it is possible to achieve cost reduction for service implementation and create various services.

In particular, according to an embodiment of the present invention, when texts which are posted on or shared in SMS messages, MMS messages, e-mails, messengers, SNS, community services, or the like are received or created through a terminal device of a user, the received texts may be converted into audio data to be provided to the user, and the user's voice may be recognized to be created as texts, so that a driver may easily check or create messages without disturbing the driver, thereby promoting safe driving and user convenience.

In addition, according to an embodiment of the present invention, a lane departure may be sensed by distinguishing an intended lane change from a lane departure caused by inattention, so that whether drowsy driving is performed may be detected to notify a driver, passengers, or a driver of another vehicle that dangerous driving is currently performed, thereby reducing the incidence of traffic accidents while driving, particularly, at night.

In addition, according to an embodiment of the present invention, a driving start time of a user may be predicted based on a driving pattern derived based on at least one of user's schedule information and driving history information, and an electronic control device of a vehicle may be controlled so as to adjust an interior temperature of the vehicle to be a set temperature before the predicted driving start time of the user, and therefore the interior temperature of the vehicle may be adjusted to be an appropriate temperature in advance when the user boards the vehicle for driving, whereby the user may drive the vehicle in a more comfortable environment.

In addition, according to an embodiment of the present invention, safe driving may be induced by providing a comparison result of eco indexes with respect to eco data collected in accordance with a driving state of a vehicle to users, economical driving information may be allowed to be recognized by drivers, a driving or starting habit of the user may be changed toward a more economical direction, and a plurality of pieces of eco data may be notified to drivers through TTS functions while present driving information or start information are displayed, thereby providing information about an optimized driving condition to the drivers in real time.

In addition, according to an embodiment of the present invention, a terminal device may be linked with a vehicle electronic control device mounted in a vehicle, fuel efficiency of the vehicle may be calculated, fuel efficiency information including the calculated fuel efficiency value may be shared with predetermined acquaintance groups, and then the fuel efficiency may be compared.

As described above, according to an embodiment of the present invention, through a link between the terminal device and the vehicle electronic control device mounted in the vehicle, various telematics services may be provided, thereby satisfying various demands of users.

The invention claimed is:
1. A telematics service system, comprising:
a terminal device configured to
predict a driving start time of a vehicle based on a driving pattern of a user, collect driving history information within a predetermined time from scheduled driving start times which are derived from schedule information of the user, update the predicted driving start time by averaging actual driving start times in the collected driving history information, compare status information of the vehicle and a set temperature before the predicted driving start time of the vehicle, and generate a temperature control signal so that an interior temperature of the vehicle reaches the set temperature; and a vehicle electronic control device attached to the vehicle, and configured to collect the status information of the vehicle, provide the collected information to the terminal device, and control a temperature adjustment device of the vehicle in accordance with the temperature control signal of the terminal device to adjust the interior temperature of the vehicle.

2. The telematics service system of claim 1, wherein the vehicle electronic control device is further configured to control the temperature adjustment device of the vehicle in accordance with the temperature control signal of the terminal device to adjust the interior temperature of the vehicle to reach the set temperature before the predicted driving start time, and stop generating the temperature control signal when the user boards the vehicle or when driving of the vehicle is started.

3. A terminal device, comprising:

a control unit configured to predict a driving start time of a vehicle based on a driving pattern of a user, collect driving history information within a predetermined time from scheduled driving start times which are derived from schedule information of the user, update the predicted driving start time by averaging actual driving start times in the collected driving history information, compare status information of the vehicle and a set temperature before the predicted driving start time of the vehicle, and generate a temperature control signal so that an interior temperature of the vehicle reaches the set temperature before the predicted driving start time;

a communication unit configured to receive the status information of the vehicle, from a vehicle electronic control device for controlling the vehicle, by communicating with the vehicle electronic control device, and transmit the temperature control signal to the vehicle electronic control device;

an input unit configured to receive an automatic adjustment request for the interior temperature of the vehicle from the user; and a storage unit configured to store the driving pattern.

4. The terminal device of claim 3, wherein the control unit comprises:

a driving prediction module configured to be operable in accordance with the automatic adjustment request for the interior temperature of the vehicle, and determine the predicted driving start time of the vehicle based on vehicle driving information of the user; and a vehicle interior temperature management module configured to compare the status information of the vehicle and the set temperature, at a predetermined time before the predicted driving start time, to generate the temperature control signal.

5. The terminal device of claim 4, wherein the driving prediction module is further configured to collect driving history information including a driving time of the vehicle for a predetermined period of time from the vehicle electronic control device, derive a repetitive driving pattern by analyzing the collected driving history information, and determine the predicted driving start time from the derived driving pattern.

6. The terminal device of claim 4, wherein the driving prediction module is further configured to derive a one-time or repetitive driving pattern from schedule information of the user, and determine the predicted driving start time from the driving pattern.

7. The terminal device of claim 4, wherein the driving prediction module is further configured to determine the predicted driving start time by averaging actual driving start times in driving history information, the driving history information is collected in at least one unit of day, week, and month.

8. The terminal device of claim 4, wherein the driving prediction module is further configured to collect driving history information within a predetermined time from scheduled driving start times which are derived from schedule information of the user, and determine the predicted driving start time by averaging actual driving start times of the collected driving history information.

9. The terminal device of claim 3, wherein the status information of the vehicle includes at least one of whether an engine of the vehicle is running, the interior temperature of the vehicle, whether a door is opened or closed, whether a window is opened or closed, and whether a temperature adjustment device of the vehicle is operated.

10. The terminal device of claim 3, wherein the control unit is further configured to determine whether an engine of the vehicle is running before controlling the interior temperature of the vehicle, and instruct the vehicle to start when it is determined that the engine of the vehicle is not running.

11. The terminal device of claim 3, wherein the temperature control signal is a control signal for at least one of an air conditioner and a heater which are mounted in the vehicle.

12. The terminal device of claim 3, further comprising an output unit configured to output at least one of an adjustment state of the interior temperature of the vehicle and process information about the interior temperature to the user.

13. The terminal device of claim 3, wherein the control unit is further configured to stop generating the temperature control signal when the user boards the vehicle or when driving of the vehicle is started.

* * * * *